United States Patent
Oguchi et al.

(10) Patent No.: US 8,511,093 B2
(45) Date of Patent: Aug. 20, 2013

(54) POWER GENERATION PLANT AND CONTROL METHOD THEREOF

(75) Inventors: Haruo Oguchi, Yokohama (JP); Toyohiro Akebi, Tokyo (JP); Takeshi Koi, Tokyo (JP); Takahiro Moribe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 681 days.

(21) Appl. No.: 12/680,126

(22) PCT Filed: Sep. 18, 2008

(86) PCT No.: PCT/JP2008/066853
§ 371 (c)(1),
(2), (4) Date: Jun. 24, 2010

(87) PCT Pub. No.: WO2009/041346
PCT Pub. Date: Apr. 2, 2009

(65) Prior Publication Data
US 2010/0275610 A1  Nov. 4, 2010

(30) Foreign Application Priority Data
Sep. 27, 2007 (JP) ................................. 2007-251316

(51) Int. Cl.
*F02C 9/48* (2006.01)
*F02C 6/18* (2006.01)

(52) U.S. Cl.
USPC ................. 60/773; 60/39.281; 60/39.182

(58) Field of Classification Search
USPC ............... 60/39.182, 772, 773, 39.281, 39.24
See application file for complete search history.

(56) References Cited

U.S. PATENT DOCUMENTS

| 3,879,616 | A | 4/1975 | Baker et al. |
| 4,013,877 | A | 3/1977 | Uram et al. |
| 7,021,062 | B2 * | 4/2006 | Tanaka et al. ................... 60/773 |

FOREIGN PATENT DOCUMENTS

| JP | 50-055736 A | 5/1975 |
| JP | 55-114825 A | 9/1980 |
| JP | 58-070009 A | 4/1983 |
| JP | 61-049111 A | 3/1986 |
| JP | 3-51104 U | 5/1991 |
| JP | 10-196315 A | 7/1998 |
| JP | 10-266812 A | 10/1998 |
| JP | 10-288006 A | 10/1998 |
| JP | 2004-027890 A | 1/2004 |
| JP | 2005-036685 A | 2/2005 |
| JP | 2006-057580 A | 3/2006 |

* cited by examiner

*Primary Examiner* — Ted Kim
(74) *Attorney, Agent, or Firm* — Foley & Lardner LLP

(57) ABSTRACT

A power generation plant comprises a plant control device (600) including two switchable control modes, i.e., a gas-turbine load control mode (7a) and a steam-turbine load control mode (7b). When the control is performed with the gas-turbine load control mode (7a), a fuel valve (104a) is controlled based on a load of a whole generator set (100), and a steam regulating valve (203a) is controlled based on an exhaust pressure of a steam turbine (202a). When the control is performed with the steam-turbine load control mode (7b), the fuel valve (104a) is controlled such that a valve opening degree thereof is maintained constant, and the steam regulating valve (203a) is controlled based on a load of the whole generator set (100).

9 Claims, 12 Drawing Sheets

PRIOR ART FIG. 1

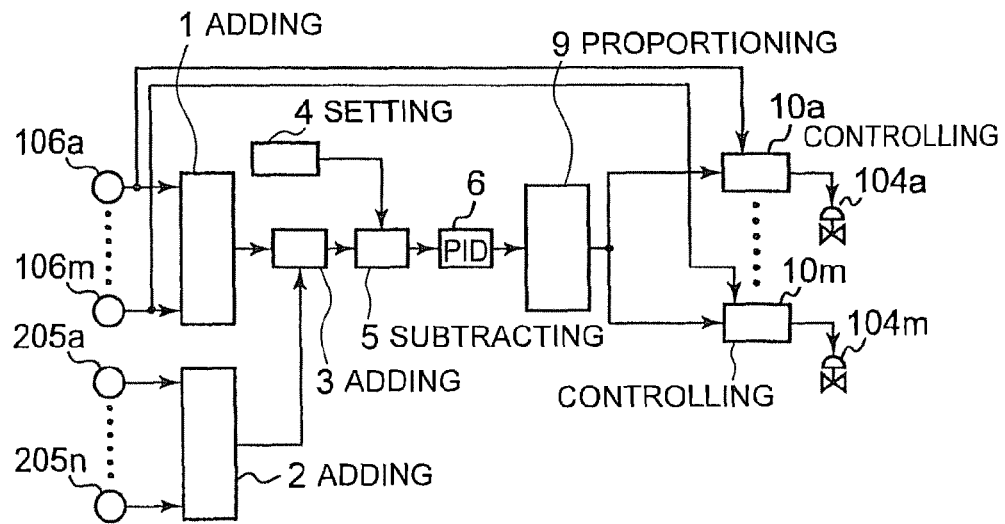
PRIOR ART FIG. 13
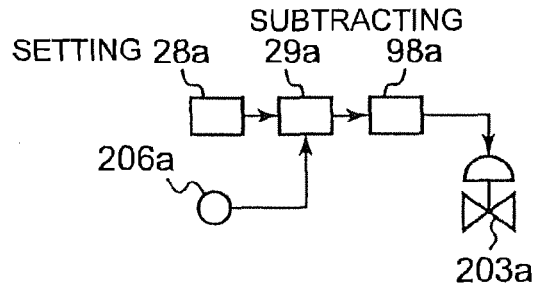
PRIOR ART FIG. 14
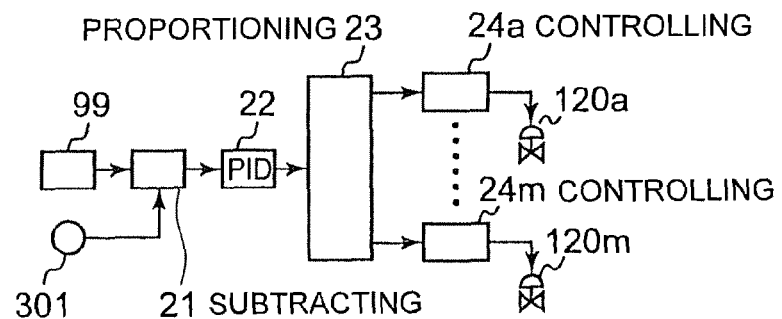
PRIOR ART FIG. 15

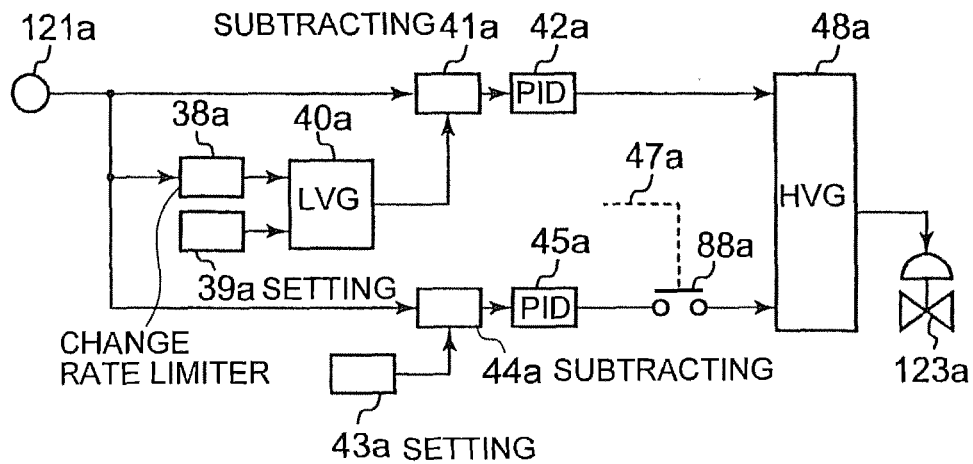
PRIOR ART FIG. 16
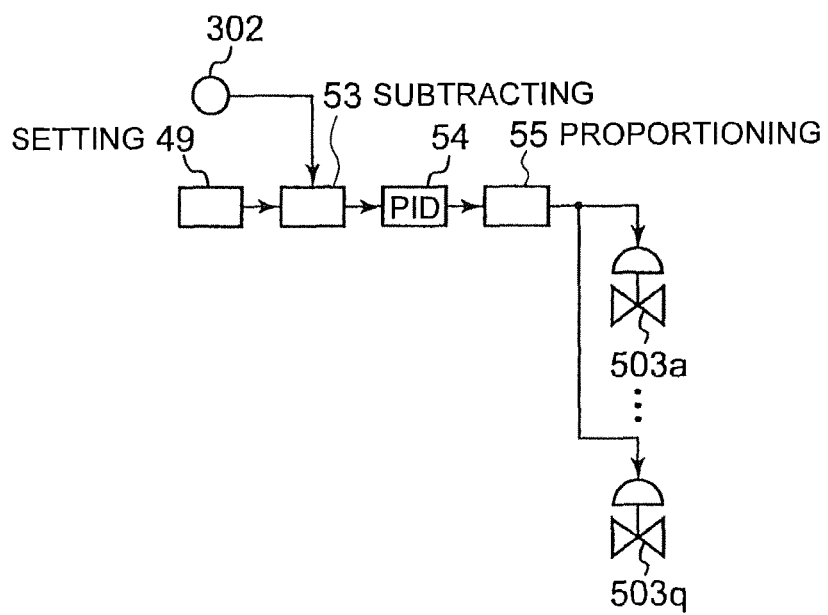
PRIOR ART FIG. 17

POWER GENERATION PLANT AND CONTROL METHOD THEREOF

FIELD OF THE INVENTION

The present invention relates to a power generation plant and a control method thereof. In particular, the present invention relates to a power generation plant comprising: a combined generator set including a gas turbine generator set having a gas turbine and a heat recovery steam generator, and a steam turbine generator set that uses a steam supplied from the heat recovery steam generator; and an additional set that uses a steam supplied from a steam turbine or the heat recovery steam generator; and a control method thereof.

BACKGROUND ART

There has been conventionally known a combined power generation plant of a so-called multi-axis type combined cycle, comprising: a plurality of gas turbine generator sets each including a gas turbine and a heat recovery steam generator; a plurality of steam turbine generator sets; and an additional set represented as a fresh water generator (see, e.g., JP61-49111A).

A structure of such a power generation plant is described with reference to FIG. 1.

As shown in FIG. 1, the power generation plant comprises a plurality of gas turbine generator sets $101a$ to $101m$ each including a gas turbine and a heat recovery steam generator; a plurality of steam turbine generator sets $201a$ to $201n$ configured to generate a power with the use of steams sent from the gas turbine generator sets $101a$ to $101m$, a plurality of additional sets $401a$ to $401p$; a plurality of condenser sets $501a$ to $501q$; and a plant control device 800 configured to control the respective aforementioned sets.

In FIG. 1, although only the first sets (the sets shown by the reference numbers having a suffix "a") of the respective sets are shown, the other sets have the same structure as that of the first set. In addition, as shown in FIG. 1, a combined generator set 100 is composed of the plurality of gas turbine generator sets $101a$ to $101m$ and the plurality of steam turbine generator sets $201a$ to $201n$.

In FIG. 1, a steam generated by the combined generator set 100 is normally sent to the additional sets $401a$ to $401p$. In the additional sets $401a$ to $401p$, the steam becomes a condensed water by a heat exchange, and the condensed water is returned to the gas turbine generator sets $101a$ to $101m$ of the generator set 100. When an amount of a steam generated in the combined generator set 100 is larger than an amount of a steam to be used in the additional sets $401a$ to $401p$, the excessive steam is sent to the condenser sets $501a$ to $501q$.

As shown in FIG. 1, the above-described gas turbine generator set $101a$ includes: a combustor $103a$ to which a fuel is sent from outside via a fuel valve $104a$, the combustor $103a$ being configured to burn the fuel so as to generate a combustion gas; a gas turbine $102a$ to which the combustion gas is sent from the combustor $103a$, the gas turbine $102a$ being configured to be driven by the combustion gas; a gas turbine generator $105a$ coaxially connected to the gas turbine $102a$, the gas turbine generator $105a$ being configured to perform a primary power generation; and a gas-turbine load detecting unit $106a$ configured to detect a load of the gas turbine generator $105a$. In addition, connected to the gas turbine $102a$ is a heat recovery steam generator $111a$ to which a combustion gas is sent from the gas turbine $102a$.

The heat recovery steam generator $111a$ is adapted to heat a condensed water sent from the below-described additional sets $401a$ to $401p$ or the condenser sets $501a$ to $501q$, by using a combustion gas sent from the gas turbine $102a$, so as to generate a steam. As shown in FIG. 1, the heat recovery steam generator $111a$ includes: evaporators $113a$ and $117a$ configured to evaporate a steam with the use of a combustion gas from the gas turbine $102a$; a deaerator $112a$ configured to deaerate a condensed water with the use of a steam sent from the evaporator $113a$; and a water supply pump $114a$ configured to increase a pressure of the condensed water deaerated by the deaerator $112a$. In addition, the heat recovery steam generator $111a$ includes: an economizer $115a$ configured to increase a temperature of the condensed water sent from the water supply pump $114a$, with the use of the combustion gas from the gas turbine $102a$; a steam drum $116a$ configured to evaporate the condensed water whose temperature has been increased by the economizer $115a$, with the use of the steam sent from the evaporator $117a$; and a superheater $118a$ configured to superheat the steam sent from the steam drum $116a$, with the use of the combustion gas from the gas turbine $102a$.

In addition, an auxiliary fuel is supplied from outside to the heat recovery steam generator $111a$ via an auxiliary fuel valve $120a$. The heat recovery steam generator $111a$ has a duct burner $119a$ that burns the auxiliary fuel so as to generate an auxiliary combustion gas. The auxiliary combustion gas generated by the duct burner $119a$ is sent to the evaporators $113a$ and $117a$, the economizer 115, and the superheater $118a$.

A heat-recovery-steam-generator exhaust pressure detecting unit $121a$ configured to detect a pressure of the steam sent from the superheater $118a$, and a flow rate detecting unit $122a$ configured to detect a flow rate of the steam are connected to the downstream side of the superheater $118a$ in this order. In addition, there is provided a bypass line $124a$ through which a steam is directly sent from the heat recovery steam generator $111a$ to the additional sets $401a$ to $401p$ or the condenser sets $501a$ to $501q$, bypassing the steam turbine generator sets $201a$ to $201n$. The bypass line $124a$ is equipped with a turbine bypass valve $123a$.

The steams sent from the above gas turbine generator sets $101a$ to $101m$ are once merged together. A pressure detecting unit 301 configured to detect a pressure of the merged steam is disposed on an upstream side of the steam turbine generator set. The merged steam is diverged again, and the diverged steams are sent to the respective steam turbine generator sets $201a$ to $201n$.

As shown in FIG. 1, the steam turbine generator set $201a$ includes: a steam turbine $202a$ to which a steam is sent from the gas turbine generator sets $101a$ to $101m$ via a steam regulating valve $203a$ configured to regulate a flow rate of the steam, the steam turbine $202a$ being configured to be driven by the steam; a steam turbine generator $204a$ coaxially connected to the steam turbine $202a$, the steam turbine generator $204a$ being configured to generate a power; and a steam-turbine load detecting unit $205a$ configured to detect a load of the steam turbine generator $204a$. Disposed on the downstream side of the steam turbine $202a$ is a steam-turbine exhaust pressure detecting unit $206a$ configured to detect a pressure of the steam sent from the steam turbine $202a$.

The steams sent form the steam turbine generator sets $201a$ to $201n$ and the steams sent from the gas turbine generator sets $101a$ to $101m$ through the bypass line $124a$ are once merged together. A pressure detecting unit 302 configured to detect a pressure of the merged steam is disposed on the downstream side of the steam turbine generator sets. The merged steam is diverged again, and the diverged steams are sent to the respective additional sets $401a$ to $401p$ and the condenser sets $501a$ to $501q$.

The additional set 401 includes: a flow rate detecting unit 404a configured to detect a flow rate of the steam sent thereto in a diverged manner; a heat exchanger 402a disposed on the downstream side of the flow rate detecting unit 404a, the heat exchanger 402a being configured to evaporate a sea water by a heat of the supplied steam so as to generate a fresh water (product water) and configured to convert the steam into a condensed water; and a condensing pump 403a configured to send the condensed water sent from the heat exchanger 402a to the heat recovery steam generators 111a to 111m of the gas turbine generator sets 101a to 101m. A sea water supply system 411 is connected to an inlet side of the heat exchanger 402a, and a sea water returning system 412 and a product water system 413 are connected to an outlet side of the heat exchanger 402a. The aforementioned product water is adapted to be sent to the product water system 413, and an excessive sea water of the sea water sent from the sea water supply system 411 is adapted to be sent to the sea water returning system 412.

The condenser set 501a includes: a flow rate detecting unit 505a configured to detect a flow rate of the steam sent thereto in a diverged manner; a condenser 502a disposed on the downstream side of the flow rate detecting unit 505a, the condenser 502a being configured to cool, by a heat exchange, the steam sent thereto via an adjusting valve 503a for adjusting a flow rate of a steam, so as to generate a condensed water; and a condensing pump 504a configured to send the condensed water sent from the condenser 502a to the heat recovery steam generators 111a to 111m of the gas turbine generator sets 101a to 101m. The sea water supply system 411 is connected to an inlet side of the condenser 502a, and the sea water returning system 412 is connected to an outlet side of the condenser 502a. The condenser 502a is configured to, when a steam is cooled by a sea water, send the sea water heated by the steam to the sea water returning system 412.

There has been described, with reference to FIG. 1, the power generation plant including the condenser sets 501a to 501q. However, instead of providing the condenser sets 501a to 501q, steam dischargeable valves may be provided on the inlet sides and/or the outlet sides of the steam turbine generator sets 101a to 101m, so as to release an excessive steam to the atmosphere.

The structures of the gas turbine generator set 101a, the steam turbine generator set 201a, the additional set 401a, and the condenser set 501a have been described hereabove. Similarly, the gas turbine generator sets 101b to 101m, the steam turbine generator sets 201b to 201n, the additional sets 401b to 401p, and the condenser sets 501b to 501q have the same structures as described above. The number of gas turbine generator sets, the steam turbine generator sets, the additional sets, and the condenser sets to be installed in the power generation plant can be determined depending on a scale of the power generation plant.

Next, an operation of the power generation plant as structured above is described with reference to FIG. 1.

Firstly, in the gas turbine generator set 101a, a fuel is supplied to the combustor 103a via the fuel valve 104a from an outside fuel system. The fuel is burned by the combustor 103a, so that a combustion gas is generated. A flow rate of the fuel to be sent to the gas turbine 102a at this time is adjusted by a valve opening degree of the fuel valve 104a. The combustion gas is sent to the gas turbine 102a, so that the gas turbine 102a is driven by the combustion gas. Thus, the gas turbine generator 105a coaxially connected to the gas turbine 102a generates a power. At this time, a load of the gas turbine generator 105a is detected by the gas-turbine load detecting unit 106a.

When an amount of a steam required by the heat recovery steam generator 111a is larger than an amount of a steam generated by the combustion gas from the gas turbine 102a, an auxiliary fuel is supplied to the duct burner 119a via the auxiliary fuel valve 120a from outside, in order to compensate the deficit. The auxiliary fuel is burned by the duct burner 119a so as to generate an auxiliary combustion gas, whereby an energy input to the heat recovery steam generator 111a is increased. A flow rate of the auxiliary fuel to be sent to the duct burner 119a is adjusted by a valve opening degree of the auxiliary fuel valve 120a. The combustion gas discharged from the gas turbine 102a and the auxiliary fuel gas discharged from the duct burner 119a are sent to the evaporators 113a and 117a, the economizer 115a, and the superheater 118a of the heat recovery steam generator 111a. The evaporates 113a and 117a generate a steam with the use of the combustion gas sent thereto.

On the other hand, a condensed water is sent from the additional sets 401a to 401p and the condenser sets 501a to 501q to the deaerator 112a of the heat recovery steam generator 111a. In the deaerator 112a, the condensed water is deaerated by a steam sent from the evaporator 113a. A pressure of the deaerated condensed water is increased by the water supply pump 114a, and the deaerated condensed water is sent to the economizer 115a. In the economizer 115a, a temperature of the condensed water is increased by the combustion gas and the auxiliary combustion gas. In addition, the condensed water whose temperature has been increased is sent to the team drum 116a. In the steam drum 116a, the condensed water is evaporated by a steam sent from the evaporator 117a, so as to generate a steam. The steam generated by the steam drum 116a is sent to the superheater 118a. In the superheater 118a, the steam is superheated by the combustion gas and the auxiliary combustion gas.

A pressure of the steam discharged from the heat recovery steam generator 111a is detected by the heat-recovery-steam-generator exhaust pressure detecting unit 121a, and a flow rate thereof is detected by the flow rate detecting unit 122a. Thereafter, when the turbine bypass valve 123a is opened, a part of the steam is diverged therefrom and sent to the bypass line 124a. Thus, the part of the steam is directly sent to the additional sets 401a to 401p or the condenser sets 501a to 501q, without passing through the steam turbine generator sets 201a to 201n.

On the other hand, as shown in FIG. 1, the steams sent from the respective gas turbine generator sets 101a to 101m are once merged together by, e.g., a steam header, and a pressure of the merged steam is detected by the pressure detecting unit 301 on the upstream side of the steam turbine generator set. The merged steam is diverged again, and the diverged steams are sent to the respective steam turbine generator sets 201a to 201n.

A flow rate of the steam to be sent to the steam turbine generator set 201a is adjusted by the regulating valve 203a, and the steam is sent to the steam turbine 202a. The steam turbine 202a is driven by the steam sent thereto, so that the steam turbine generator 204 coaxially connected to the steam turbine 202a performs a secondary power generation. At this time, a load of the steam turbine generator 204a is detected by the steam-turbine load detecting unit 205a. Then, a steam is discharged from the steam turbine 202a, and a pressure of the steam is detected by the steam-turbine exhaust pressure detecting unit 206a.

The steams sent from the steam turbine generator sets 201a to 201n and the steams sent from the gas turbine generator sets 101a to 101m through the bypass line 124a are once merged together by, e.g., a steam header, and a pressure of the merged steam is detected by the pressure detecting unit 302 on the downstream side of the steam turbine generator set. The merged steam is diverged again, and the diverged steams are sent to the respective additional sets 401a to 401p and the condenser sets 501a to 501q.

In the additional set 401a, a flow rate of the above steam sent thereto in a diverged manner is detected by the flow rate detecting unit 404a, and then the steam is sent to the heat exchanger 402a. On the other hand, a sea water is sent to the heat exchanger 402a from the sea water supply system 411. In the heat exchanger 402a, heats of the steam and the sea water are exchanged, so that the steam is cooled so as to generate a condensed water, and that the sea water is heated to be evaporated so as to generate a product water. The condensed water generated by the heat exchanger 402a is discharged from the additional set 401a by the condensing pump 403a. On the other hand, the product water generated by the heat exchanger 402a is sent to the product water system 413, and is discharged outside the power generation plant. The sea water, which is not converted to a product water and is left in the heat exchanger 402a, is sent to the sea water returning system 412, and is discharged outside the power generation plant.

In the condenser set 501a, a flow rate of the above steam sent thereto in a diverged manner is detected by the flow rate detecting unit 505a. After the flow rate thereof has been adjusted by the adjusting valve 503a, the steam is sent to the condenser 502a. On the other hand, a sea water is sent to the condenser 502a from the sea water supply system 411. In the condenser 502a, heats of the steam and the sea water are exchanged, so that the steam is cooled so as to generate a condensed water, and that the sea water is heated. The condensed water generated by the condenser 502a is discharged from the condenser set 501a by the condensing pump 504a. On the other hand, the sea water heated by the condenser 502a is sent to the sea water returning system 412, and is discharged outside the power generation plant.

The condensed waters discharged from the additional sets 401a to 401p and the condensed waters discharged from the condenser sets 501a to 501q are once merged together. The merged condensed water is diverged again, and the diverged condensed waters are sent to the respective deaerators 112a to 112m of the heat recovery steam generators 111a to 111m of the gas turbine generator sets 101a to 101m.

Next, there is described the conventional plant control device 800 that controls the gas turbine generator sets 101a to 101m, the steam turbine generator sets 201a to 201n, the additional sets 401a to 401p, and the condenser sets 501a to 501q, with reference to FIGS. 13 to 17.

FIG. 13 is a block diagram showing a control of the fuel valves 104a to 104m disposed on fuel systems of the gas turbines 102a to 102m of the gas turbine generator sets 101a to 101m. FIG. 14 is a block diagram showing a control of the steam regulating valve 203a disposed on a main steam system of the steam turbine 202a of the steam turbine generator set 201a. FIG. 15 is a block diagram showing a control of the auxiliary fuel valves 120a to 120m disposed on fuel systems of the duct burners 119a to 119m of the gas turbine generator sets 101a to 101m. FIG. 16 is a block diagram showing a control of the turbine bypass valve 123a on the bypass line 124a connected to the gas turbine generator set 101a. FIG. 17 is a block diagram showing a control of the adjusting valves 503a to 503q disposed on the upstream sides of the condensers 502a to 502q of the condenser sets 501a to 501q.

[Control of Fuel Valves of Gas Turbine Generator Sets]

With reference to FIG. 13, there is described the control of the fuel valves 104a to 104m disposed on the upstream sides of the fuel systems of the gas turbines 102a to 102m of the gas turbine generator sets 101a to 101m.

Firstly, loads of the gas turbine generators 105a to 105m, which are respectively detected by the gas-turbine load detecting units 106a to 106m, are sent to an adder 1. In the adder 1, a sum value of the loads is calculated. Similarly, loads of the steam turbine generators 204a to 204n, which are respectively detected by the steam-turbine load detecting units 205a to 205n, are sent to an adder 2. In the adder 2, a sum value of the loads is calculated. Then, in an adder 3, the sum value of the loads calculated by the adder 1 and the sum value of the loads calculated by the adder 2 are added, and the added value is sent to a subtracter 5.

On the other hand, set in a setting device 4 is a whole generator set load command value, which is sent from a central feed command part, or a whole generator set load command value, which is inputted by an operator. The whole generator set load command value is sent to the subtracter 5. In the subtracter 5, there is calculated a difference between the sum value of the detected loads, which is sent from the adder 3, and the whole generator set load command value, which is sent from the setting device 4. Then, the difference is sent to a PID controller 6. In the PID controller 6, a fuel-valve load control command value is adjusted by a PID control such that the difference sent from the subtracter 5 is made smaller. Then, the adjusted fuel-valve load control command value is sent to a proportioner 9. Herein, the PID control means a control in which a proportional control (P control), an integral control (I control), and a derivative control (D control) are combined to one another.

In the proportioner 9, based on the number of the activated ones of the gas turbines 102a to 102m, the fuel-valve load control command value sent from the PID controller 6 is proportionally distributed to respective gas turbine control devices 10a to 10m. Then, the fuel-valve load control command values, which are proportionally distributed by the proportioner 9, are sent to the activated ones of the respective gas turbine control devices 10a to 10m.

Based on the fuel-valve load control command values sent from the proportioner 9, the respective gas turbine control devices 10a to 10m control the fuel valves 104a to 104m disposed on the upstream sides of the gas turbines 102a to 102m so as to adjust valve opening degrees of the fuel valves 104a to 104m. To be specific, the valve opening degrees of the fuel valves 104a to 104m are respectively adjusted by the respective gas turbine control devices 10a to 10m, such that the loads of the gas turbine generators 105a to 105m, which are sent from the respective gas-turbine load detecting units 106a to 106m, become substantially the same as the fuel-valve load control command values, which are sent from the proportioner 9.

[Control of Steam Regulating Valve of Steam Turbine Generator Set]

With reference to FIG. 14, there is described the control of the steam regulating valve 203a disposed on the upstream side of the steam turbine 202a of the steam turbine generator set 201a. In FIG. 14, although the control of the steam regulating valve 203a is described, the steam regulating valves 203b to 203n are controlled in the same manner.

Firstly, an exhaust pressure on the downstream side of the steam turbine 202a, which is detected by the steam-turbine exhaust pressure detecting unit 206a, is sent to a subtracter 29a. On the other hand, set in a setting device 28a is a steam-turbine exhaust pressure set value, which is sent from the central feed command part, or a steam-turbine exhaust pressure set value, which is inputted by an operator. The steam-turbine exhaust pressure set value is sent to the subtracter 29a. In the subtracter 29a, there is calculated a difference between the detected exhaust pressure value, which is sent from the steam-turbine exhaust pressure detecting unit 206a, and the steam-turbine exhaust pressure set value, which is sent from the setting device 28a. Then, the difference is sent to a PID controller 98a.

In the PID controller 98a, a regulating-valve control command value is adjusted by the PID control such that the difference sent from the subtracter 29a is made smaller. The adjusted regulating-valve control command value is sent to the steam regulating valve 203a.

Due to the aforementioned control, a valve opening degree of the steam regulating valve 203a is adjusted such that the exhaust pressure value of the steam on the downstream side of the steam turbine 202a, which is detected by the steam-turbine exhaust pressure detecting unit 206a, becomes substantially the same as the steam-turbine exhaust pressure set value, which is set by the setting device 28a.

[Control of Auxiliary Fuel Valves for Duct Burners of Gas Turbine Generator Sets]

With reference to FIG. 15, there is described the control of the auxiliary fuel valves 120a to 120m disposed on the upstream sides of the duct burners 119a to 119m of the gas turbine generator sets 101a to 101m.

Firstly, a pressure of a steam, which is detected by the pressure detecting unit 301 on the upstream side of the steam turbine generator set, is sent to a subtracter 21. On the other hand, set in a setting device 99 is a steam-turbine inlet-side pressure set value, which is sent from the central feed command part, or a steam-turbine inlet-side pressure set value, which is inputted by an operator. The steam-turbine inlet-side pressure set value is sent to the subtracter 21. In the subtracter 21, there is calculated a difference between the detected pressure value, which is sent from the pressure detecting unit 301 on the upstream side of the steam turbine generator set, and the steam-turbine inlet-side pressure set value, which is sent from the setting device 99. Then, the difference is sent to a PID controller 22. In the PID controller 22, an auxiliary-fuel-valve control command value is adjusted by the PID control such that the difference sent from the subtracter 21 is made smaller. The adjusted auxiliary-fuel-valve control command value is sent to a proportioner 23.

In the proportioner 23, based on the number of the activated ones of the duct burners 119a to 119m, the auxiliary-fuel-valve control command value sent from the PID controller 22 is proportionally distributed to respective duct burner control devices 24a to 24m. Then, the auxiliary-fuel-valve control command values, which are proportionally distributed by the proportioner 23, are sent to the activated ones of the respective duct burner control devices 24a to 24m.

Based on the auxiliary-fuel-valve control command values sent from the proportioner 23, the respective duct burner control devices 24a to 24m control the auxiliary fuel valves 120a to 120m disposed on the upstream sides of the duct burners 119a to 119m so as to adjust valve opening degrees of the auxiliary fuel valves 120a to 120m. To be specific, the valve opening degrees of the auxiliary fuel valves 120a to 120m are respectively adjusted by the respective duct burner control devices 24a to 24m, such that the detected pressure of the steam, which is sent from the pressure detecting unit 301 on the upstream side of the steam turbine generator set, becomes substantially the same as the steam-turbine inlet-side pressure set value, which is set by the setting device 99.

[Control of Turbine Bypass Valve on Bypass Line Connected to Gas Turbine Generator Set]

With reference to FIG. 16, there is described the control of the turbine bypass valve 123a on the bypass line 124a connected to the gas turbine generator set 101a. In FIG. 16, although the control of the turbine bypass valve 123a is described, the turbine bypass valves 123b to 123m are controlled in the same manner.

Firstly, an exhaust pressure on the downstream side of the heat recovery steam generator 111a, which is detected by the heat-recovery-steam-generator exhaust pressure detecting unit 121a, is sent to a change rate limiter 38a, a subtracter 41a, and a subtracter 44a. Set in the change rate limiter 38a is a pressure change rate, based on the structures of the respective instruments of the heat recovery steam generator 111a. The exhaust pressure sent from the heat-recovery-steam-generator exhaust pressure detecting unit 121a is adjusted by the change rate limiter 38a, such that a change rate of the exhaust pressure becomes the set pressure change rate or smaller. Then, the smoothened exhaust pressure is sent to a low value selector 40a. On the other hand, set in a setting device 39a is a maximum pressure set value, based on the structures of the respective instruments of the heat recovery steam generator 111a. The maximum pressure set value is sent to the low value selector 40a. The low value selector 40a selects a lower one of the smoothened exhaust pressure, which is sent from the change rate limiter 38a, and the maximum pressure set value, which is sent from the setting device 39a. Then, the selected control set value is sent to a subtracter 41a.

In the subtracter 41a, there is calculated a difference between the exhaust pressure, which is sent from the heat-recovery-steam-generator exhaust pressure detecting unit 121a, and the control set value, which is sent from the low value selector 40a. Then, the difference is sent to a PID controller 42a. In the PID controller 42a, a turbine-bypass-valve control command value is adjusted by the PID control such that the difference sent from the subtracter 41a is made smaller. The adjusted turbine-bypass-valve control command value is sent to a high value selector 48a. To be specific, the turbine-bypass-valve control command value is adjusted such that the exhaust pressure of the steam on the downstream side of the heat recovery steam generator 111a, which is detected by the heat-recovery-steam-generator exhaust pressure detecting unit 121a, becomes substantially the same as the control set value, which is selected by the low value selector 40a.

In addition, set in a setting device 43a is a pressure set value when activation of the heat recovery steam generator is stopped. The pressure set value is sent to a subtracter 44a. In the subtracter 44a, there is calculated a difference between the exhaust pressure, which is sent from the heat-recovery-steam-generator exhaust pressure detecting unit 121a, and the control set value, which is sent from the setting device 43a. Then, the difference is sent to a PID controller 45a. In the PID controller 45a, a turbine-bypass-valve control command value is adjusted by the PID control such that the difference sent from the subtracter 44a is made smaller. The adjusted turbine-bypass-valve control command value is sent to a switch 88a. To be specific, the turbine-bypass-valve control command value is adjusted such that the exhaust pressure on the downstream side of the heat recovery steam generator 111a, which is detected by the heat-recovery-steam-generator exhaust pressure detecting unit 121a, becomes substantially the same as the pressure set value, which is set by the setting device 43a.

When a heat-recovery-steam-generator activation stop mode 47a is ON, the switch 88a is adapted to send the turbine-bypass-valve control command value, which is adjusted by the PID controller 45a, to the high value selector 48a. On the other hand, when the heat-recovery-steam-generator activation stop mode 47a is OFF, the switch 88a is adapted to block the transmission of the turbine-bypass-valve control command value from the PID controller 45a to the high value selector 48a. Herein, the heat-recovery-steam-generator activation stop mode 47a is a signal that is turned on, when the heat recovery steam generator 111a is in the course of activating or stopping, and is turned off when the heat recovery steam generator 111a is stably operated or stopped.

The high value selector 48a selects a higher one of the turbine-bypass-valve control command value, which sent from the ND controller 42a, and the turbine-bypass-valve control command value, which is sent from the PID controller 45a, and sends the selected turbine-bypass-valve control command value to the turbine bypass valve 123a so as to adjust a valve opening degree thereof.

Thus, when the heat recovery steam generator 111a is in the course of activating or stopping, the turbine bypass valve 123a is controlled and the valve opening degree thereof is adjusted such that the exhaust pressure on the downstream side of the heat recover steam generator 111a becomes substantially the same as the pressure set value set by the setting device 43a. On the other hand, when the heat recovery steam generator 111a is stably operated or stopped, the turbine bypass valve 123a is fully closed in principle.

Suppose that, during a stable operation of the heat recovery steam generator 111a, the exhaust pressure on the downstream side of the heat recovery steam generator 111a changes at a change rate larger than the set change rate set by the change rate limiter 38a, or that the exhaust pressure becomes larger than the maximum pressure set value set by the setting device 39a. In this case, the turbine bypass valve 123a is opened, so that there is performed a discharge control in which the steam on the downstream side of the heat recovery steam generator 111a is discharged.

[Control of Steam-Turbine Exhaust-Side Pressure Adjusting Valves Disposed on Condenser Sets]

With reference to FIG. 17, there is described the control of the exhaust pressure adjusting valves 503a to 503q disposed on the upstream sides of the condensers 502a to 502q of the condenser sets 501a to 501q.

Firstly, a pressure of the steam, which is detected by the pressure detecting unit 302 on the downstream side of the steam turbine generator set, is sent to a subtracter 53. On the other hand, set in a setting device is a steam-turbine outlet-side pressure set value, which is sent from the central feed command part, or a steam-turbine outlet-side pressure set value, which is inputted by an operator. The steam-turbine outlet-side pressure set value is sent to the subtracter 53. In the subtracter 53, there is calculated a difference between the detected pressure, which is sent from the pressure detecting unit 302 on the downstream side of the steam turbine generator set, and the steam-turbine outlet-side pressure set value, which sent from the setting device 49. Then, the difference is sent to a PID controller 54. In the PID controller 54, an adjusting-valve control command value is adjusted by the PID control such that the difference sent from the subtracter 53 is made smaller. The adjusted adjusting-valve control command value is sent to a proportioner 55.

In the proportioner 55, based on the number of the activated ones of the condensers 502a to 502q, the adjusting-valve control command value sent from the PID controller 54 is proportionally distributed to the respective adjusting valves 503a to 50q. Then, the adjusting-valve control command values, which are proportionally distributed by the proportioner 55, are sent to the activated ones of the respective adjusting valves 503a to 503q.

Based on the adjusting-valve control command values sent from the proportioner 55, valve opening degrees of the respective adjusting valves 503a to 503q are adjusted. To be specific, the valve opening degrees of the adjusting valves 503a to 503q are respectively adjusted such that the detected pressure, which is sent from the pressure detecting unit 302 on the downstream side of the steam turbine generator set, becomes substantially the same as the steam-turbine outlet-side pressure set value, which is set by the setting device 49.

The steam-turbine outlet-side pressure set value set by the setting device 49 is larger than the steam-turbine exhaust pressure set value set by the setting device 28a. Thus, when the regulating valves 203a to 203n disposed on the upstream sides of the steam turbines 201a to 201n can be controlled by the exhaust pressures of the steam turbines 202a to 202n, the adjusting valves 503a to 503q are fully closed, so that the condensers 502a to 502q are not operated and stopped. On the other hand, the regulating valves 203a to 203n cannot be controlled by the exhaust pressures of the steam turbines 202a to 202n, the adjusting valves 503a to 503q are opened so that the condensers 502a to 502q are operated, whereby there is performed a discharge control in which the steams from the steam turbines 201a to 202n are discharged.

As described above, in the generation plant shown in FIG. 1, the steam, which have been generated by the combined generator set 100 and used for generating a power, is used by the additional sets 401a to 401m. There occurs no problem, when the power generation load command for the combined generator set 100 and the load commands for the additional sets 401a to 401m are balanced, in terms of steam amounts. However, the two command values are generally set independently.

For example, in a case where the additional sets 401a to 401m are fresh water generator sets, a power generation load command is lower than a fresh-water generation load command, in terms of steam amounts, in a winter season where a power consumption is low, whereby the balance between the steam amounts is lost. In this case, it is necessary for an operator to increase a load of the duct burner 119a disposed on the heat recovery steam generator so as to increase a steam amount to be generated by the combined generator set 100, whereby the whole generation plant has a different balance point from the existing balance point.

When the load of the duct burner 119a is increased while utilizing a load control of the whole combined generator set, loads of the steam turbine 201a to 201m are increased while loads of the gas turbine 102a to 102m are decreased. As a result, an amount of steam to be generated by the gas turbines 102a to 102m is decreased.

Thus, under condition that the load control of the whole generator set is manually performed so as to stop the load control, the load of the duct burner 109a is increased to a suitable load, the turbine bypass valve 123a is opened, and thereafter the load control of the whole generator set automatically performed. When the power generation load command cannot be satisfied, the same procedure is repeated.

Since an energy input by the duct burner 119a to the heat recovery steam generator is changed so as to change a steam amount, there is a delay of the heat recovery steam generator, which makes such an operation very difficult. In order to balance the power generation load command and the steam amount used by additional sets, an operator should have a skill and it takes a lot of time for the operation.

In addition, during this operation, the load control is not performed, and thus there is a problem in that a long-term power generation load command cannot be satisfied. Further, there is a possibility that the turbine bypass valve 123a may be unnecessarily opened so that a steam is supplied to the additional sets, which impairs the efficiency of the generator sets.

In addition, in the conventional plant control device 800, there is a problem in that a load control range of the whole generator sets is ranging from (minimum load of all the gas turbines)+(a certain load of all the steam turbines at this time) to (maximum load of all the gas turbines)+(a certain load of all the steam turbines at this time), and thus an operation deviating from the range is impossible. Further, a variation of a system frequency can be amended only by the gas turbine, there is a problem with a responsibility of the whole generator sets.

Moreover, volumes of each gas turbine and each heat recovery steam generator tend to be enlarged, and thus a volume of the steam turbine tends to be enlarged in accordance therewith. Thus, there is a case wherein a load command value sent from the central feed command part is independently supplied to each generator, in addition to the whole generator sets. In this case, there is a problem in that the conventional plant control device 800 cannot cope with this case.

SUMMARY OF THE INVENTION

The present invention has been made in view of the aforementioned circumstances. The object of the present invention is to provide a power generation plant and a control method thereof capable of making suitable a flow rate of a steam, which is discharged from a heat recovery steam generator of a gas turbine generator set, and a flow rate of a steam, which is sent to a steam turbine of a steam turbine generator set, depending on an operational situation of a combined generator set, whereby an overall power generation efficiency can be improved.

The present invention is a power generation plant comprising: a gas turbine generator set including a combustor configured to burn a fuel sent thereto via a fuel valve, a gas turbine driven by a combustion gas sent from the combustor, a gas turbine generator connected to the gas turbine and configured to generate a power, a heat recovery steam generator configured to generate a steam by an exhaust heat of the combustion gas exhausted from the gas turbine, and a gas-turbine load detecting unit configured to detect a load of the gas turbine generator; a steam turbine generator set including a steam turbine driven by the steam sent from the heat recovery steam generator via a steam regulating valve, a steam turbine generator connected to the steam turbine and configured to generate a power, a steam-turbine load detecting unit configured to detect a load of the steam turbine generator, and a steam-turbine exhaust pressure detecting unit configured to detect a pressure of the steam sent from the steam turbine; an additional set configured to use an exhaust steam of the steam turbine or a steam sent from the heat recovery steam generator; and a plant control device including two switchable control modes which include a gas-turbine load control mode and a steam-turbine load control mode, the plant control device being configured to control the fuel valve of the gas turbine generator set and the steam regulating valve of the steam turbine generator set so as to adjust valve opening degrees of the fuel valve and the steam regulating valve, respectively; wherein: the plant control device includes a control mode judgment logic device configured to judge which one of the gas-turbine load control mode and the steam-turbine load control mode is used, depending on an operational situation of the power generation plant; when the control is performed with the gas-turbine load control mode based on the judgment result from the control mode judgment logic device, the fuel valve is controlled based on a sum of the load of the gas turbine generator, which is detected by the gas-turbine load detecting unit, and the load of the steam turbine generator, which is detected by the steam-turbine load detecting unit, and the steam regulating valve is controlled based on the pressure of the steam, which is detected by the steam-turbine exhaust pressure detecting unit; and when the control is performed with the steam-turbine load control mode based on the judgment result from the control mode judgment logic device, the fuel valve is controlled such that a valve opening degree thereof is maintained constant, and the steam regulating valve is controlled based on a difference between a preset whole generator set load command value and the load of the gas turbine generator, which is detected by the gas-turbine load detecting unit.

According to such a power generation plant, the plant control device normally performs the control with the gas-turbine load control mode in which the fuel valve of the gas turbine generator set is controlled based on a load of the whole generator set, and the regulating valve of the steam turbine generator set is controlled based on a pressure of the exhaust steam of the steam turbine. Depending on an operational situation of the power generation plant, the plant control device performs the control with the steam-turbine load control mode in which the valve opening degree of the fuel valve of the gas turbine generator set is maintained constant, and the regulating valve of the steam turbine generator set is controlled based on a load of the whole generator set. As described above, by switching the control mode of the plant control device, flow rate of the steam discharged from the heat recovery steam generator of the gas turbine generator set, and flow rate of the steam to be sent to the steam turbine of the steam turbine generator set, can be changed to desired flow rate, depending on an operational situation of the combined generator set. Thus, an overall power generation efficiency of the power generation plant can be improved.

The present invention is a control method of a power generation plant comprising: a gas turbine generator set including a combustor configured to burn a fuel sent thereto via a fuel valve, a gas turbine driven by a combustion gas sent from the combustor, a gas turbine generator connected to the gas turbine and configured to generate a power, a heat recovery steam generator configured to generate a steam by an exhaust heat of the combustion gas exhausted from the gas turbine, and a gas-turbine load detecting unit configured to detect a load of the gas turbine generator; a steam turbine generator set including a steam turbine driven by the steam sent from the heat recovery steam generator via a steam regulating valve, a steam turbine generator connected to the steam turbine and configured to generate a power, a steam-turbine load detecting unit configured to detect a load of the steam turbine generator, and a steam-turbine exhaust pressure detecting unit configured to detect a pressure of the steam sent from the steam turbine; an additional set configured to use an exhaust steam of the steam turbine or a steam sent from the heat recovery steam generator; and a plant control device including two switchable control modes which include a gas-turbine load control mode and a steam-turbine load control mode, the plant control device being configured to control the fuel valve of the gas turbine generator set and the steam regulating valve of the steam turbine generator set so as to adjust valve opening degrees of the fuel valve and the steam regulating valve, respectively; the control method comprising: a step in which, which one of a gas-turbine load control mode and a steam-turbine load control mode is used is judged by a control mode judgment logic device of the plant control device, depending on an operational situation of the power generation plant; and a step in which, when the control is performed with the gas-turbine load control mode based on the judgment result from the control mode judgment logic device, the fuel valve of the combustor is controlled based on a sum of the load of the gas turbine generator, which is detected by the gas-turbine load detecting unit, and the load of the steam turbine generator, which is detected by the steam-turbine load detecting unit, and the steam valve regulating valve is controlled based on the pressure of the steam, which is detected by the steam-turbine exhaust pressure detecting unit, and when the control is performed with the steam-turbine load control mode based on the judgment result from the control mode judgment logic device, the fuel valve of the combustor is controlled such that a valve opening degree thereof is maintained constant, and the steam regulating valve is controlled based on a difference between a preset whole generator set load command value and the load of the gas turbine generator, which is detected by the gas-turbine load detecting unit.

According to such a control method of the power generation plant, there is performed the control with the gas-turbine load control mode in which the fuel valve of the gas turbine generator set is controlled based on a load of the whole generator set, and the regulating valve of the steam turbine generator set is controlled based on a pressure of the exhaust steam of the steam turbine. Depending on an operational situation of the power generation plant, there is performed the control with the steam-turbine load control mode in which the valve opening degree of the fuel valve of the gas turbine generator set is maintained constant, and the regulating valve of the steam turbine generator set is controlled based on a load of the whole generator set. As described above, by switching the control mode of the plant control device, flow rate of the steam discharged from the heat recovery steam generator of the gas turbine generator set, and flow rate of the steam to be sent to the steam turbine of the steam turbine generator set, can be changed to desired flow rate, depending on an operational situation of the combined generator set. Thus, an overall power generation efficiency of the power generation plant can be improved.

As described above, according to the power generation plant and the control method thereof of the present invention, the plant control device normally performs the control with the gas-turbine load control mode in which the fuel valve of the gas turbine generator set is controlled based on a load of the whole generator set, and the regulating valve of the steam turbine generator set is controlled based on pressure of the exhaust steam of the steam turbine. Depending on an operational situation of the power generation plant, the plant control device performs the control with the steam-turbine load control mode in which the valve opening degree of the fuel valve of the gas turbine generator set are maintained constant, and the regulating valve of the steam turbine generator set is controlled based on a load of the whole generator set. As described above, by switching the control mode of the plant control device, flow rate of the steam discharged from the heat recovery steam generator of the gas turbine generator set, and flow rate of the steam to be sent to the steam turbine of the steam turbine generator set, can be changed to desired flow rate, depending on an operational situation of the combined generator set. Thus, an overall power generation efficiency of the power generation plant can be improved.

BRIEF DESCRIPTION OF THE DRAWINGS

FIG. 13 is a block diagram showing, in a conventional example, a control of fuel valves on upstream sides of gas turbines of gas turbine generator sets.

FIG. 14 is a block diagram showing, in the conventional example, control of a regulating valve on the upstream side of a steam turbine of a steam turbine generator set.

FIG. 15 is a block diagram showing, in the conventional example, control of auxiliary fuel valves on the upstream sides of duct burners of the gas turbine generator sets.

FIG. 16 is a block diagram showing, in the conventional example, control of a turbine bypass valve on a bypass line connected to the gas turbine generator set.

FIG. 17 is a block diagram showing, in the conventional example, control of adjusting valves on the upstream sides of condensers of condenser sets.

BEST MODE FOR CARRYING OUT THE INVENTION

First Embodiment

A first embodiment of the present invention will be described herebelow with reference to the drawings.

Figure 1:
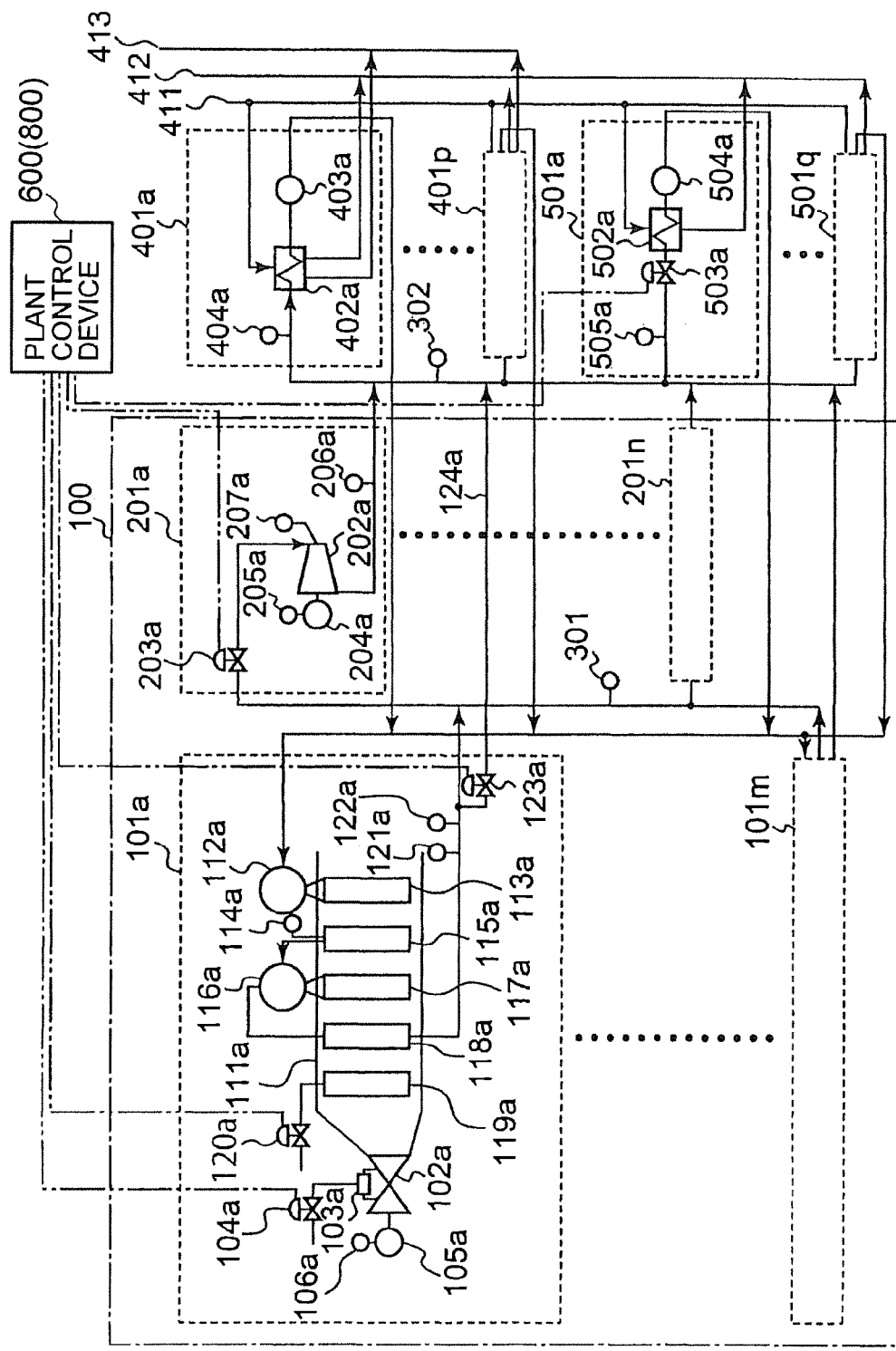
FIG. 1 is a structural view showing a power generation plant.

FIG. 1 is a structural view showing a structure of a power generation plant. The power generation plant in this embodiment is a combined power generation plant of so-called multi-axis type combined cycle, comprising: a plurality of gas turbine generator sets 101a to 101m each including a gas turbine and a heat recovery steam generator; a plurality of steam turbine generator sets 201a to 201n configured to generate a power with the use of steams sent from the gas turbine generator sets 101a to 101m; a plurality of additional sets 401a to 401p; a plurality of condenser sets 501a to 501q; and a plant control device 600 configured to control the respective aforementioned sets.

The power generation plant of the present invention is substantially the same as the conventional power generation plant, which has been described in the background art section, excluding the structure of the plant control device 600, and thus a detailed description thereof is omitted.

With reference to FIGS. 2 to 7, there is described the plant control device 600 in this embodiment that controls the gas turbine generator sets 101a to 101m, the steam turbine generator sets 201a to 201n, the additional sets 401a to 401p, and the condenser sets 501a to 501q.

Figure 2:
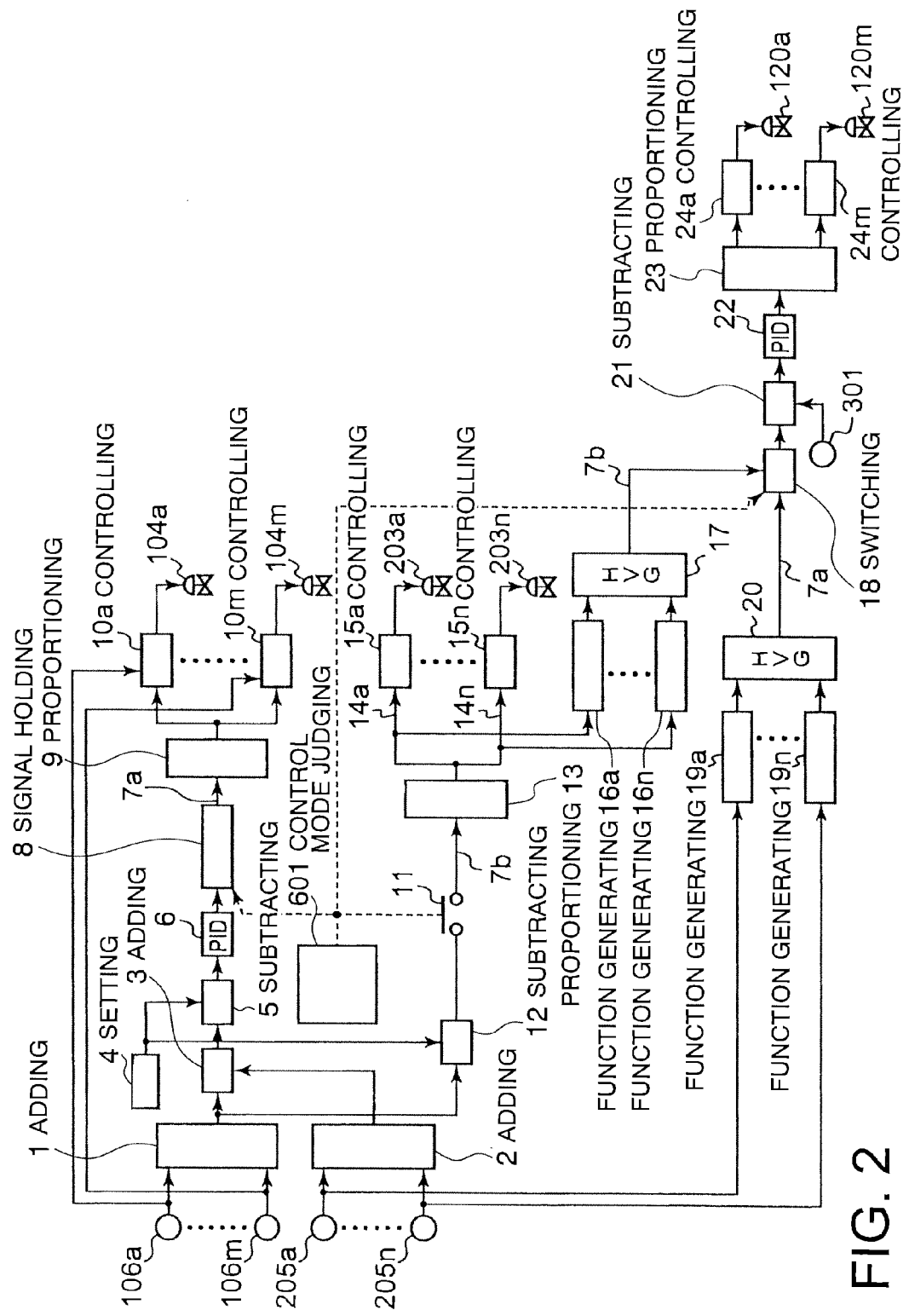
FIG. 2 is a block diagram showing, in a first embodiment, a control of fuel valves of gas turbines and auxiliary fuel valves of duct burners in gas turbine generator sets, and steam regulating valves of steam turbines in steam turbine generator sets.
Figure 3:
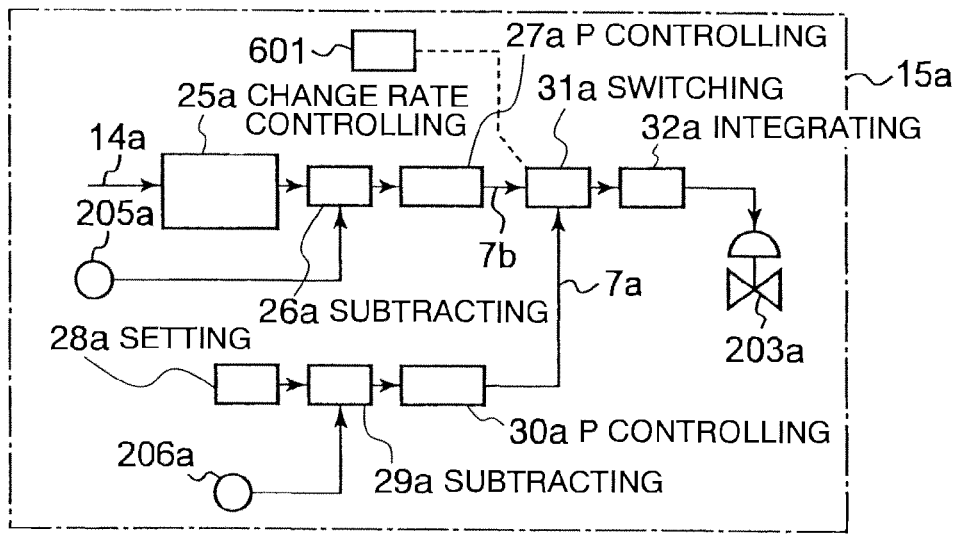
FIG. 3 is a block diagram showing a detailed control system structure by a steam turbine control device in FIG. 2.

FIG. 2 is a block diagram showing a control system structure of fuel valves 104a to 104m of gas turbines 102a to 102m and auxiliary fuel valves 120a to 120m of duct burners 119a to 119m in the gas turbine generator sets 101 to 101m, and steam regulating valves 203a to 203n of steam turbines 202a to 202n in the steam turbine generator sets 201a to 201n. FIG. 3 is a block diagram showing a detailed control system structure by a steam turbine control device 15a in FIG. 2.

Figure 4:
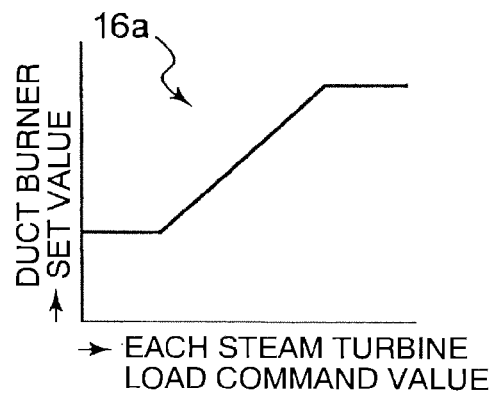
FIG. 4 is a graph showing a relationship between steam turbine load command values inputted to function generators (16a to 16n) in FIG. 2 and duct burner set values outputted therefrom.
Figure 5:
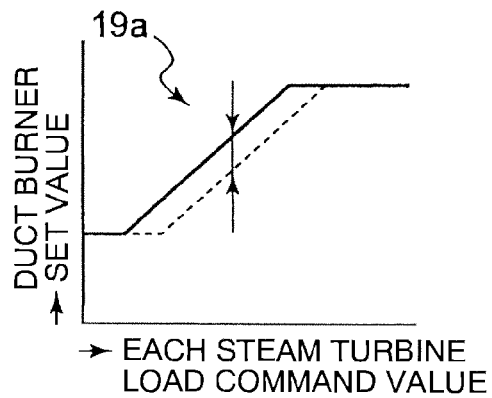
FIG. 5 is a graph showing a relationship between steam turbine load command values inputted to function generators (19a to 19n) in FIG. 2 and duct burner set values outputted therefrom.
Figure 6:
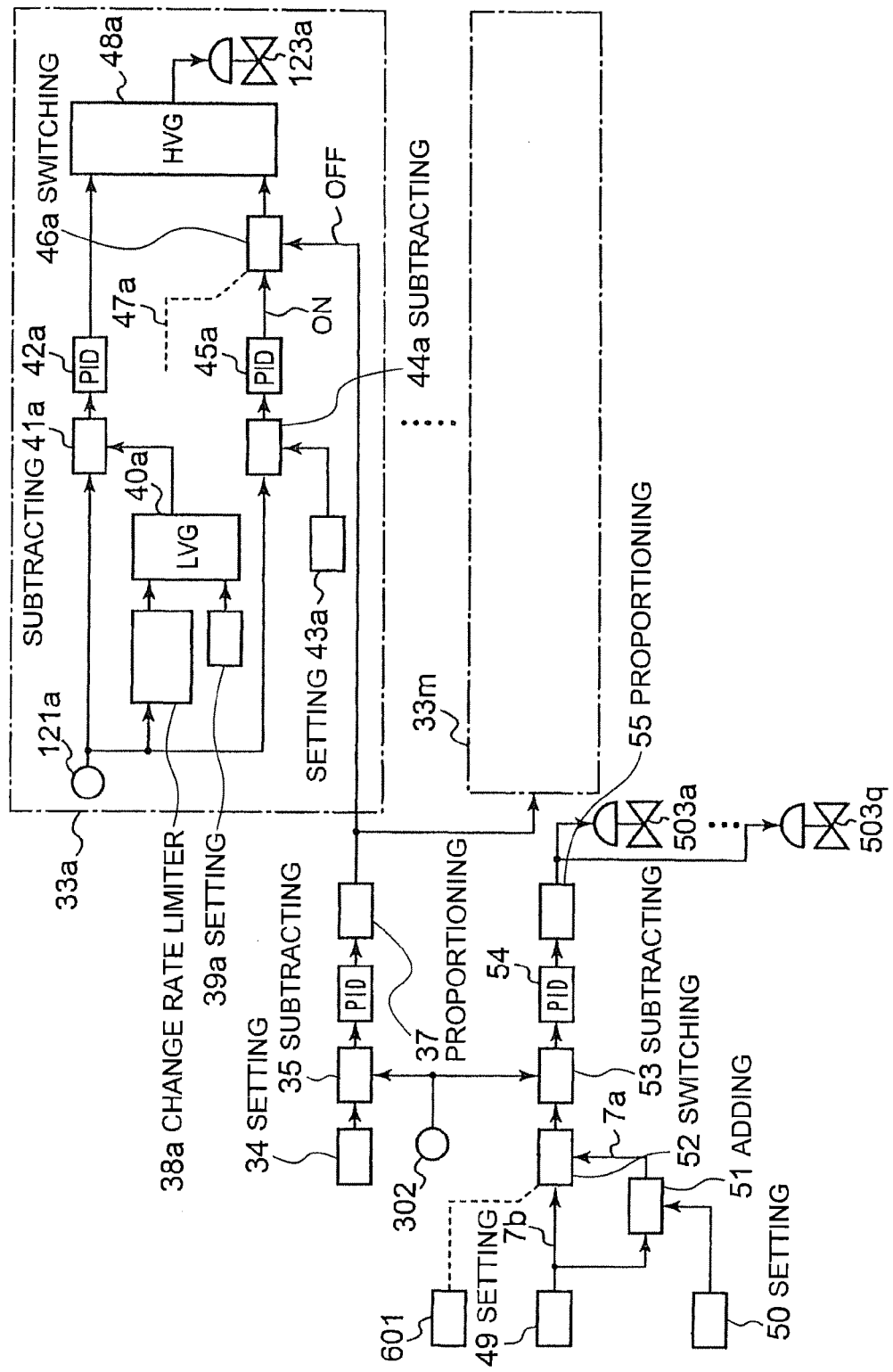
FIG. 6 is a block diagram showing, in the first embodiment, a control system structure of a turbine bypass valve on a bypass line connected to the gas turbine generator set, and adjusting valves on upstream sides of condensers of condenser sets.

FIG. 4 is a graph showing a relationship between steam turbine load command values inputted to function generators 16a to 16n in FIG. 2 and duct burner set value outputted therefrom. FIG. 5 is a graph showing a relationship between steam turbine load command values inputted to function generator 19a to 19n in FIG. 2 and duct burner set values outputted therefrom. FIG. 6 is a block diagram showing a control system structure of a turbine bypass valve 123a on a bypass line 124a connected to the gas turbine generator set 101a, and adjusting valves 503a to 503q on upstream sides of condensers 502a to 502q of the condenser sets 501a to 501q.

Figure 7:
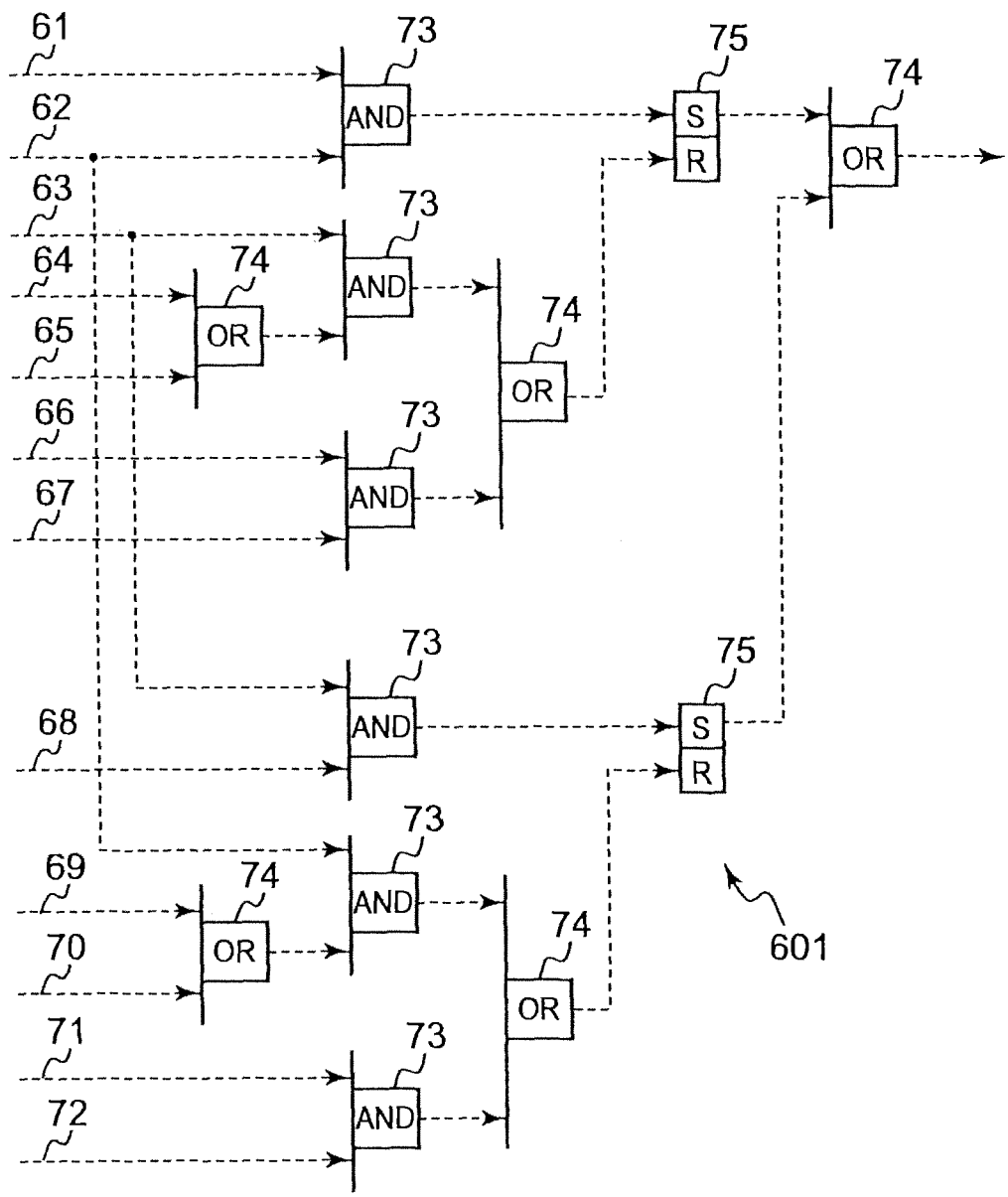
FIG. 7 is a view for explaining a judging method of a control mode judgment logic device employed in the first embodiment.

FIG. 7 is a view for explaining a judging method of a control mode judgment logic device 601 employed in the first embodiment.

The plant control device 600 in this embodiment includes the control mode judgment logic device 601 configured to selectively judge which one a gas-turbine load control mode 7a and a steam-turbine load control mode 7b is used, depending on an operational situation of the power generation plant. The plant control device 600 performs a control with the gas-turbine load control mode 7a, when the power generation plant is normally operated. When it is judged by the control mode judgment logic device 601 that the steam-turbine load control mode 7b is used, the plant control device 600 performs a control with the steam-turbine load control mode 7b. Details of the judging method by the control mode judgment logic device 601 is described hereafter.

[Control of Gas Turbine Fuel Valves in Gas Turbine Generator Sets]

With reference to FIG. 2, there is described the control of the fuel valves 104a to 104m disposed on fuel supply systems of the gas turbines 102a to 102m of the gas turbine generator sets 101a to 101m.

Firstly, loads of the gas turbine generators 105a to 105m, which are respectively detected by gas-turbine load detecting units 106a to 106m, are sent to an adder 1. In the adder 1, a sum value of the respective loads is calculated. Similarly, loads of steam turbine generators 204a to 204n, which are respectively detected by steam-turbine load detecting units 205a to 205n, are sent to an adder 2. In the adder 2, a sum value of the respective loads is calculated. Then, in an adder 3, the sum value of the loads calculated by the adder 1 and the sum value of the loads calculated by the adder 2 are added to each other. Then, the added value is sent to a subtracter 5.

On the other hand, set in a setting device 4 is a whole generator set load command value, which is sent from a central feed command part, or a whole generator set load command value, which is inputted by an operator. The whole generator set load command value is sent to the subtracter 5. In the subtracter 5, there is calculated a difference between the sum value of the detected loads, which is sent from the adder 3, and the whole generator set load command value, which is sent from the setting device 4. Then, the difference is sent to a PID controller 6. In the PID controller 6, a fuel-valve load control command values is adjusted by a PID control such that the difference sent from the subtracter 5 is made smaller. Then, the adjusted fuel-valve load control command value is sent to a signal holder 8. Herein, the PID control means a control in which a proportional control (P control), an integral control (I control), and a derivative control (D control) are combined to one another.

When the control is performed with the gas-turbine load control mode 7a which is a normal control mode, the signal holder 8 sends the fuel-valve load control command value, which is sent from the PID controller 6 as it is, to a proportioner 9.

In the proportioner 9, based on the number of the activated ones of the gas turbines 102a to 102m, the fuel-valve load control command value sent from the signal holder 8 is proportionally distributed to respective gas turbine control devices 10a to 10m. Then, the fuel-valve load control command values, which are proportionally distributed by the proportioner 9, are sent to the activated ones of the respective gas turbine control devices 10a to 10m.

Based on the fuel-valve load control command values sent from the proportioner 9, the respective gas turbine control devices 10a to 10m adjust valve opening degrees of the fuel valves 104a to 104m of the gas turbines 102a to 102m. To be specific, the valve opening degrees of the fuel valves 104a to 104m are respectively adjusted by the respective gas turbine control devices 10a to 10m, such that the loads of the gas turbine generators 105a to 105m, which are sent from the respective gas-turbine load detecting units 106a to 106m, become substantially the same as the fuel-valve load control command values, which are sent from the proportioner 9.

In FIG. 2, due to the above-described control, when the control is performed with the gas-turbine load control mode 7a, the valve opening degrees of the fuel valves 104a to 104m are adjusted such that the sum value of the respective loads of the gas turbine generators 105a to 105m and the respective loads of the steam turbine generators 204a to 204n becomes substantially the same as the whole generator set load command value.

On the other hand, when the control is performed with the steam-turbine load control mode 7b, since the fuel-valve load control command value to be sent to the gas turbine control devices 10a to 10m is held by the signal holder 8, the valve opening degrees of the fuel valves 104a to 104 are maintained constant.

[Control of Steam Regulating Valves in Steam Turbine Generator Sets]

With reference to FIGS. 2 and 3, there is described the control of the steam regulating valves 203a to 203n disposed on the upstream sides of the steam turbines 202a to 202n of the steam turbine generator sets 201a to 201n.

As shown in FIG. 2, the sum value of the loads of the respective gas turbine generators 105a to 105m, which is calculated in the adder 1, is firstly sent to a subtracter 12. Simultaneously, the whole generator set load command value is sent to the subtracter 12 from the setting device 4. In the subtracter 12, there is calculated a difference between the sum value of the detected loads, which is sent from the adder 1, and the whole generator set load command value, which is sent from the setting device 4. Then, the difference is sent to a switch 11. When the control is performed with the steam-turbine load control mode 7b, the switch 11 sends the difference sent from the subtracter 12 to a proportioner 13. On the other hand, when the control is performed with the gas-turbine load control mode 7a, the switch 11 blocks the transmission of the difference from the subtracter 12 to the proportioner 13.

In the proportioner 13, based on the activated ones of the steam turbines 202a to 202n, the difference sent from the switch 11 is proportionally distributed to respective steam turbine control devices 15a to 15n, so as to calculate respective load command values 14a to 14n. Then, the load command values 14a to 14n, which are proportionally distributed by the proportioner 13, are respectively sent to the activated ones of the respective steam turbine control devices 15a to 15n.

Next, with reference to FIG. 3, there are described details of the control by the steam turbine control device 15a. In FIG. 3, although the control of the regulating valve 203a by the steam turbine control device 15a is described, the regulating valves 203b to 203n are controlled in the same manner.

As shown in FIG. 3, the load command value 14a from the proportioner 13 is sent to a change rate limiter 25a. Set in the change rate limiter 25a is a load change rate depending on the structure of the steam turbine 202a. The load command value 14a is adjusted by the change rate limiter 25a such that a change rate of the load command value 14a becomes the set load change rate or smaller. The smoothened load command value is sent to a subtracter 26a. On the other hand, a load of the steam turbine generator 204a, which is detected by the steam-turbine load detecting unit 205a, is sent to the subtracter 26a. In the subtracter 26a, there is calculated a difference between the load command value, which is sent from the change rate limiter 25a, and the detected load value, which is sent from the steam-turbine load detecting unit 205a. Then, the difference is sent to a P controller 27a. In the P controller 27a, a regulating-valve control command value is adjusted by the P control (proportional control) such that the difference sent from the subtracter 26a is made smaller. The adjusted regulating-valve control command value is sent to a switching device 31a.

On the other hand, as shown in FIG. 3, an exhaust pressure of the steam turbine 202a, which is detected by the steam-turbine pressure detecting unit 206a, is sent to a subtracter 29a. Set in a setting device 28a is a steam-turbine exhaust pressure set value which is sent from the central feed command part, or a steam-turbine exhaust pressure set value which is inputted by an operator. The steam-turbine exhaust pressure set value is sent to the subtracter 29a. In the subtracter 29a, there is calculated a difference between the exhaust pressure, which is sent from the steam-turbine pressure detecting unit 206a, and the steam-turbine exhaust pressure set value, which sent from the setting device 28a. Then, the difference is sent to a P controller 30a.

In the P controller 30a, a regulating-valve control command value is adjusted by the P control (proportional control) such that the difference sent from the subtracter 29a is made smaller. The adjusted regulating-valve control command value is sent to the switching device 31a.

When the control is performed with the steam-turbine load control mode 7b, the switching device 31a sends the regulating-valve control command value sent from the P controller 27a to an integrator 32a. On the other hand, when the control is performed with the gas-turbine load control mode 7a, the switching device 31a sends the regulating-valve control command value sent from the P controller 30a to the integrator 32a.

The integrator 32a integrates the regulating-valve control command value sent from the switching device 31a, and sends the integrated regulating-valve control command value integrated by the integrator 32a to the steam regulating valve 203a. Then, a valve opening degree of the steam regulating valve 203a is adjusted based on the regulating-valve control command value sent from the integrator 32a.

In FIGS. 2 and 3, due to the above-described control, when the control is performed with the gas-turbine load control mode 7a, the valve opening degree of the regulating valve 203a is adjusted such that the exhaust pressure of the steam turbine 202a, which is detected by the steam-turbine exhaust pressure detecting unit 206a, becomes substantially the same as the steam-turbine exhaust pressure set value set by the setting device 28a.

On the other hand, when the control is performed with the steam-turbine load control mode 7b, the valve opening degree of the regulating valve 203a is adjusted such that the sum value of the respective loads of the gas turbine generators 105a to 105m and the respective loads of the steam turbine generators 204a to 204n becomes substantially the same as the whole generator set load command value set by the setting device 4.

[Control of Auxiliary Fuel Valves of Duct Burners in Gas Turbine Generator Sets]

With reference to FIGS. 2 to 4, there is described the control of the auxiliary fuel valves 120a to 120m disposed on the upstream sides of the duct burners 119a to 119m of the gas turbine generator sets 101a to 101m.

In FIG. 2, the load command values 14a to 14n, which are proportionally distributed by the above proportioner 13, are respectively sent to the function generators 16a to 16n. Based on the respective inputted load command values 14a to 14n, the respective function generators 16a to 16n calculate duct burner set values, and send the duct burner set values to a high value selector 17. FIG. 4 is a graph showing a relationship between the load command values 14a to 14n inputted to the function generators 16a to 16n and the duct burner set values outputted therefrom. The high value selector 17 selects the highest value among the duct burner set values respectively sent from the function generators 16a to 16n, and sends the selected value to a switching device 18.

On the other hand, the loads of the respective steam turbine generators 205a to 205n are sent from the respective steam-turbine load detecting units 205a to 205n to function generators 19a to 19n. The respective function generators 19a to 19n calculate duct burner set values based on the inputted detected loads, and sends the duct burner set values to a high value selector 20. In the graph of FIG. 5, the solid line shows a relationship between the load command values 14a to 14n inputted to the function generators 19a to 19n and the duct burner set values outputted therefrom.

In FIG. 5, the dotted lines show a relationship between the load command values 14a to 14n to be inputted and the duct burner set values to be outputted in FIG. 4. Namely, in FIG. 5, when the detected load values sent from the respective steam-turbine load detecting units 205a to 205n are within a predetermined range, the duct burner set values outputted by the function generators 19a to 19n become values in which preset bias values shown in FIG. 5 are added to the duct burner set values outputted by the function generators 16a to 16n when the load values are the same.

The high value selector 20 selects the highest value among the duct burner set values respectively sent from the function generators 19a to 19n, and sends the selected value to the switching device 18.

When the control is performed with the steam-turbine load control mode 7b, the switching device 18 sends the duct burner set value, which is sent from the high value selector 17, to a subtracter 21. On the other hand, when the control is performed with the gas-turbine load control mode 7a, the switching device 18 sends the duct burner set value, which is sent from the high value selector 20, to the subtracter 21. In the subtracter 21, there is calculated a difference between a pressure value, which is sent from a pressure detecting unit 301 on the upstream side of the steam turbine generator set, and the duct burner set value, which is sent from the switching device 18. Then, the difference is sent to a PID controller 22. In the PID controller 22, an auxiliary-fuel-valve control command value is adjusted by the PID control such that the difference sent from the subtracter 21 is made smaller. The adjusted auxiliary-fuel-valve control command value is sent to a proportioner 23.

In the proportioner 23, based on the number of the activated ones of the duct burners 119a to 119m, the auxiliary-fuel-valve control command value sent from the PID controller 22 is proportionally distributed to respective duct burner control devices 24a to 24m. Then, the auxiliary-fuel-valve control command values, which are proportionally distributed by the proportioner 23, are sent to the activated ones of the respective duct burner control devices 24a to 24m.

Based on the auxiliary-fuel-valve control command values sent from the proportioner 23, the respective duct burner control devices 24a to 24m control the auxiliary fuel valves 120a to 120m disposed on the upstream sides of the duct burners 119a to 119m so as to adjust valve opening degrees of the auxiliary fuel valves 120a to 120m.

Due to the above-described control, when the control is performed with the steam-turbine load control mode 7b, the valve opening degrees of the auxiliary fuel valves 120a to 120m are respectively adjusted such that the detected pressure value, which is sent from the pressure detecting unit 301 on the upstream side of the steam turbine generator set, becomes substantially the same as the duct burner set value, which is calculated by the high value selector 17.

On the other hand, when the control is performed with the gas-turbine load control mode 7a, the valve opening degrees of the auxiliary fuel valves 120a to 120m are respectively adjusted such that the detected pressure value, which is sent from the pressure detecting unit 301 on the upstream side of the steam turbine generator set, becomes substantially the same as the duct burner set value, which is calculated by the high value selector 20. The duct burner set value calculated by the high value selector 20 is larger than the duct burner set value to be calculated by the high value selector 17 by the bias value, when the load values are the same.

[Control of Turbine Bypass Valves on Bypass Lines Connected to Gas Turbine Generator Sets]

With reference to FIG. 6, there is described the control of the turbine bypass valves 123a to 123m on the bypass lines 124a to 124m connected to the gas turbine generator sets 101a to 101m.

Firstly, a pressure of a steam on the downstream side of the steam turbine generator sets 201a to 201n, which is detected by a pressure detecting unit 302 on the downstream side of the steam turbine generator set, is sent to a subtracter 35. On the other hand, set in a setting device 34 is a pressure set value which is a value smaller than the steam-turbine exhaust pressure set value set by the setting device 28a. The pressure set value is sent from the setting device 34 to the subtracter 35. In the subtracter 35, there is calculated a difference between the detected pressure value, which is sent from the pressure detecting unit 302 on the downstream side of the steam turbine generator set, and the pressure set value, which is sent from the setting device 34. Then, the difference is sent to a PID controller 36. In the PID controller 36, a turbine-bypass-valve control command value is adjusted by the PID control such that the difference sent from the subtracter 35 is made smaller. The adjusted turbine-bypass-valve control command value is sent to a proportioner 37.

In the proportioner 37, based on the number of the activated ones of turbine bypass control devices 33a to 33m, the turbine-bypass-valve control command value sent from the PID controller 36 is proportionally distributed to the turbine bypass control devices 33a to 33m. Then, the turbine-bypass-valve control command values, which are proportionally distributed by the proportioner 37, are respectively sent to a switching devices 46a of the activated turbine bypass control devices 33a to 33m.

Next, with reference to FIG. 6, there is described the control of the turbine bypass valve 123a by the turbine bypass control device 33a. In FIG. 6, although the control of the turbine bypass valve 123a is described, the turbine bypass valves 123b to 123m are controlled in the same manner.

Firstly, an exhaust pressure detected by a heat-recovery-steam-generator exhaust pressure detecting unit 121a is sent to a change rate limiter 38a, a subtracter 41a, and a subtracter 44a, respectively. Set in the change rate limiter 38 is a pressure change rate depending on the structures of the respective instruments in the heat recovery steam generator 111a. The exhaust pressure, which is sent from the heat-recovery-steam-generator exhaust pressure detecting unit 121a, is adjusted by the change rate limiter 38a such that a change rate of the exhaust value becomes the set pressure change rate or smaller. The smoothened exhaust pressure is sent to a low value selector 40a. On the other hand, set in a setting device 39a is a maximum pressure set value depending on the structures of the respective instruments in the heat recovery steam generator 111a. The maximum pressure set value is sent to the low value selector 40a. The low value selector 40a selects a lower one of the smoothened exhaust pressure, which is sent from the change rate limiter 38a, and the maximum pressure set value, which is sent from the setting device 39a, and sends the selected control set value to a subtracter 41a.

In the subtracter 41a, there is calculated a difference between the exhaust pressure value, which is sent from the heat-recovery-steam-generator exhaust pressure detecting unit 121a, and the control set value, which is sent from the low value selector 40a. Then, the difference is sent to a PID controller 42a. In the PID controller 42a, a turbine-bypass-valve control command value is adjusted by the PID control such that the difference sent from the subtracter 41a is made smaller. The adjusted turbine-bypass-valve control command value is sent to a high value selector 48a. To be specific, the turbine-bypass-valve control command value is adjusted such that the exhaust pressure, which is detected by the heat-recovery-steam-generator exhaust pressure detecting unit 121a, becomes substantially the same as the control set value, which is selected by the low value selector 40a.

Set in a setting device 43a is a pressure set value when activation of the heat recovery steam generator is stopped. The pressure set value is sent to a subtracter 44a. In the subtracter 44a, there is calculated a difference between the exhaust pressure, which is sent from the heat-recovery-steam-generator exhaust pressure detecting unit 121*a*, and the control set value, which is sent from the setting device 43*a*. Then, the difference is sent to a PID controller 45*a*. In the PID controller 45*a*, a turbine-bypass-valve control command value is adjusted by the PID control such that the difference sent from the subtracter 44*a* is made smaller. The adjusted turbine-bypass-valve control command value is sent to a switching device 46*a*.

To be specific, the turbine-bypass-valve control command value is adjusted such that the exhaust pressure on the downstream side of the heat recovery steam generator 111*a*, which is detected by the heat-recovery-steam-generator exhaust pressure detecting unit 121*a*, becomes substantially the same as the pressure set value, which is set by the setting device 43*a*.

When a heat-recovery-steam-generator activation stop mode 47*a* is ON, the switching device 46*a* is adapted to send the turbine-bypass-valve control command value, which is adjusted by the PID controller 45*a*, to the high value selector 48*a*. On the other hand, when the heat-recovery-steam-generator activation stop mode 47*a* is OFF, the switching device 46*a* is adapted to send the turbine-bypass-value control command values, which are proportionally distributed by the above proportioner 37, to the high value selector 48*a*. Herein, the heat-recovery-steam-generator activation stop mode 47*a* is a signal that is turned on, when the heat recovery steam generator 111*a* is in the course of activating or stopping, and is turned off when the heat recovery steam generator 111*a* is stably operated or stopped.

The high value selector 48*a* selects a higher one of the turbine-bypass-valve control command value, which is sent from the PID controller 42*a*, and the turbine-bypass-valve control command value, which is sent from the switching device 46*a*, and sends the selected turbine-bypass-valve control command value to the turbine bypass valve 123*a* so as to adjust a valve opening degree thereof.

Due to the above control, when the heat recovery steam generator 111*a* is in the course of activating or stopping, the turbine bypass valve 123*a* is controlled and the valve opening degree thereof is adjusted such that the exhaust pressure on the downstream side of heat recovery steam generator 111*a* becomes substantially the same as the pressure set value set by the setting device 43*a*. On the other hand, when the heat recovery stem generator 111*a* is stably operated or stopped, the turbine bypass valve 123*a* is controlled and the valve opening degree thereof is adjusted such that the pressure of the steam on the down stream side of the steam turbine generator sets 201*a* to 201*n*, which is detected by the pressure detecting unit 302 on the downstream side of the steam turbine generator set, becomes substantially the same as the pressure set value set by the setting device 34.

Suppose that, during a stable operation of the heat recovery steam generator 111*a*, the exhaust pressure of the steam on the downstream side of the heat recovery steam generator 111*a* changes at a change rate larger than the set change rate set by the change rate limiter 38*a*, or that the exhaust pressure becomes larger than the maximum pressure set value set by the setting device 39*a*. In this case, the turbine bypass valve 123*a* is opened, so that there is performed a discharge control in which the steam on the downstream side of the heat recovery steam generator 111*a* is discharged.

[Control of Adjusting Valves on Upstream Sides of Condensers of Condenser Sets]

With reference to FIG. 6, there is described the control of adjusting valves 503*a* to 503*q* disposed on upstream sides of condensers 502*a* to 502*q* of the condenser sets 501*a* to 501*q*.

Firstly, a condenser pressure set value is previously set in a setting device 49, and the condenser pressure set value is sent to a switching device 52 and an adder 51. On the other hand, set in a setting device 50 is a bias value relative to the condenser pressure set value set by the setting device 49. The bias value is determined based on the control of the exhaust pressure performed by the steam turbine control device 15*a* and an interference thereof. The bias value is sent from the setting device 50 to the adder 51. In the adder 51, the condenser pressure set value, which is sent from the setting device 49, and the bias value, which is sent from the setting device 50, are added to each other. The added value is sent to the switching device 52.

When the control is performed with the steam-turbine load control mode 7*b*, the switching device 52 sends the condenser pressure set value, which is sent from the setting device 49, to a subtracter 53. On the other hand, when the control is performed with the gas-turbine load control mode 7*a*, the switching device sends a value obtained by adding the condenser pressure set value, which is set by the setting device 49, and the bias value, which is set by the setting device 50, to each other, to the subtracter 53.

In the subtracter 53, there is calculated a difference between the detected pressure value, which is sent from the pressure detecting unit 302 on the downstream side of the steam turbine generator set, and the pressure set value, which is sent from the switching device 52. Then, the difference is sent to a PID controller 54. In the PID controller 54, an adjusting-valve control command value is adjusted by the PID control such that the difference sent from the subtracter 53 is made smaller. The adjusted adjusting-valve control command value is sent to a proportioner 55.

In the proportioner, based on the number of the activated ones of the condensers 502*a* to 502*q*, the adjusting-valve control command value sent from the PID controller 54 is proportionally distributed to the respective adjusting valves 503*a* to 503*q*. Then, the adjusting-valve control command values, which are proportionally distributed by the proportioner 55, are sent to the activated ones of the respective adjusting valves 503*a* to 503*q*.

Based on adjusting-valve control command values sent from the proportioner 55, valve opening degrees of the respective adjusting valves 503*a* to 509*q* are adjusted. To be specific, when the control is performed with the gas-turbine load control mode 7*a*, the valve opening degrees of the adjusting valves 503*a* to 503*q* are respectively adjusted such that the pressure of the steam on the outlet side of the steam turbine generator sets 201*a* to 201*n*, which is sent from the pressure detecting unit 302 on the downstream side of the steam turbine generator set, becomes substantially the same as the value obtained by adding the condenser pressure set value, which is set by the setting device 49, and the bias value, which is set by the setting device 50, to each other. Meanwhile, when the control is performed with the steam-turbine load control mode 7*b*, the valve opening degrees of the adjusting valves 503*a* to 503*q* are respectively adjusted such that the pressure of the steam on the outlet side of the steam turbine generator sets 201*a* to 201*n*, which is sent from the pressure detecting unit 302 on the downstream side of the steam turbine generator set, becomes substantially the same as the condenser pressure set value, which is set by the setting device 49.

[Judging Method by Control Mode Judgment Logic Device]

With reference to FIG. 7, there is described the judging method by the control mode judgment logic device 601.

As shown in FIG. 7, inputted to the control mode judgment logic device 601 are signals such as a signal 61 indicating that all the activated gas turbines reach a minimum load, a signal 62 indicating that a whole generator set load is lowering, a signal 63 indicating that a whole generator set load is rising, a signal 64 indicating that all the activated steam turbines reach a maximum load, a signal 65 indicating that all the activated duct burners reach a maximum load, a signal 66 indicating that all the activated turbine bypass valves are fully closed, a signal 67 indicating that the steam-turbine exhaust-side pressure is a high pressure or more, a signal 68 indicating that all the activated gas turbines reach a maximum load, a signal 69 indicating that all the activated steam turbines reach a minimum load, a signal 70 indicating that all the activated duct burners reach a minimum load, a signal 71 indicating that all the activated condenser adjusting valves are fully closed, and a signal 72 indicating that the steam-turbine exhaust-side pressure is a low pressure or less.

For example, the input signal 61 indicating that all the activated gas turbines reach a minimum load is described. When a sum value of the loads of all the activated gas turbine generators 105a to 105m is lowered to reach a preset minimum load value, an ON signal is inputted to the control mode judgment logic device 601. Meanwhile, when the sum value is not lowered to the minimum load value, an OFF signal is inputted to the control mode judgment logic device 601. Similarly, regarding the respective signals 62 to 72, an ON signal or an OFF signal is inputted to the control mode judgment logic device 601. The signal 62 indicating that a whole generator set load is lowering, and the signal 63 indicating that whole generator set load is rising, may be calculated by a decrease or an increase of an actual sum value of the loads of the whole generator 100 with respect to a whole generator set load command value, which is sent from the central feed command part, or a whole generator set load command value, which is inputted by an operator.

The control mode judgment logic device 601 shown in FIG. 7 includes an AND logic 73, an OR logic 74, and a flip-flop logic 75. The AND logic 73 is adapted to send an ON signal to a subsequent logic, when all the two or more signals sent to the AND logic 73 are ON signals. Otherwise, the AND logic 73 is adapted to send an OFF signal to the subsequent logic.

The flip-flop logic 75 is adapted to send an ON signal to a subsequent logic and hold an ON state of a flip-flop circuit in the flip-flop logic 75, when an ON signal is inputted to an S input (set input) and an OFF signal is inputted to an R input (reset input). When an OFF signal is inputted to the S input and an ON signal is inputted to the R set, the flip-flop logic 75 is adapted to send an OFF signal to the subsequent logic and hold an OFF state of the flip-flop circuit. In addition, when an ON signal is inputted to the S input and an ON signal is inputted to the R input, the flip-flop becomes unstable so that the holding of the set state is lost. When an OFF signal is inputted to the S input and an OFF signal is inputted to the R input, the state of the flip-flop is held as it is.

When a signal outputted from the control mode judgment logic device 601 shown in FIG. 7 is an ON signal, the control mode judgment logic device 601 judges that the control is performed with the steam-turbine load control mode 7b. On the other hand, when a signal outputted from the control mode judgment logic device 601 is an OFF signal, the control mode judgment logic device 601 judges that the control is performed with the gas-turbine load control mode 7a.

In the control mode judgment logic device 601 in FIG. 7, when the signal indicating that all the activated gas turbines reach a minimum load, or the signal 68 indicating that all the activated gas turbines reach a maximum load, is an ON signal, it is judged in principle that the control is performed with the steam-turbine load control mode 7b. On the other hand, when the signal 66 indicating that all the activated turbine bypass valves are fully closed, or the signal 71 indicating that all the activated condenser adjusting valves are fully closed, is an ON signal, it is judged in principle that the control is performed with the gas-turbine load control mode 7a.

According to the power generation plant in the aforementioned embodiment, the plant control device normally performs the control with the gas-turbine load control mode 7a in which the fuel valves 104a to 104m of the gas turbine generator sets 101a to 101m are controlled based on a load of the whole generator set 100, and the regulating valves 203a to 203n of the steam turbine generator sets 201a to 201n are controlled based on pressures of the exhaust steams of the steam turbines 202a to 202n. Depending on an operational situation of the power generation plant, the plant control device performs the control with the steam-turbine load control mode 7b in which the valve opening degrees of the fuel valves 104a to 104m of the gas turbine generator sets 101a to 101m are maintained constant, and the regulating valves 203a to 203n of the steam turbine generator sets 201a to 201n are controlled based on a load of the whole generator set 100.

As described above, by switching the control mode of the plant control device 600, flow rates of the steams discharged from the heat recovery steam generators 111a to 111m of the gas turbine generator sets 101a to 101m, and flow rates of the steams to be sent to the steam turbines 202a to 202n of the steam turbine generator sets 201a to 201n, can be changed to desired flow rates, depending on an operational situation of the combined generator set 100. Thus, an overall power generation efficiency of the power generation plant can be improved.

In addition, the control mode judgment logic device 601 of the plant control device 600 judges that the control is performed with the steam-turbine load control mode 7b, when the loads of the gas turbine generators 105a to 105m, which are detected by the gas-turbine load detecting units 106a to 106m, reach the preset maximum value or the preset minimum value.

Thus, when the power generation plant is operated with the loads of the gas turbine generators 105a to 105m being within a normal operational range, the control is performed with the gas-turbine load control mode 7a. Meanwhile, when the loads of the gas turbine generators 105a to 105m deviate from the normal operational range, the control is performed with the steam-turbine load control mode 7b. Therefore, flow rates discharged from the heat recovery steam generators 111a to 111m of the gas turbine generator sets 101a to 101m, and flow rates to be sent to the steam turbines 202a to 202n of the steam turbine generator sets 201a to 201n, can be more accurately controlled.

In addition, the plant control device 600 controls, with the steam-turbine load control mode 7b, the auxiliary fuel valves 120a to 120m in accordance with the difference between the whole generator set load command value and the duct burner set value calculated based on the loads of the gas turbine generators 105a to 105m. Meanwhile, the plant control device 600 controls, with the gas-turbine load control mode 7a, the auxiliary fuel valves 120a to 120m in accordance with the set value obtained by adding the preset bias value to the duct burner set value calculated based on the loads of the steam-turbine generators 204a to 204n.

Thus, an amount of the auxiliary fuel to be sent to the duct burners 119a to 119m is adjusted to a desired amount depending on an operational situation of the power generation plant, so that an amount of the auxiliary combustion gas used in the heat recovery steam generators 111a to 111m is adjusted.

Therefore, flow rates of the steams discharged from the heat recovery steam generators 111a to 111m of the gas turbine generator sets 101a to 101m can be more accurately controlled depending on an operational situation of the power generation plant.

In addition, the plant control device 600 controls the turbine bypass valves 123a to 123m on the bypass lines 124a to 124m by turning on/off the heat-recovery-steam-generator activation stop mode 47a.

Thus, an amount of the steam directly sent from the heat recovery steam generators 111a to 111m of the gas turbine generator sets 101a to 101m through the bypass lines 124a to 124m can be adjusted depending on operational situations of the heat recovery steam generators 111a to 111m. Therefore, an amount of the steam generated in the generator set 100 and an amount of the steam used in the additional sets 401a to 401p can be constantly well balanced.

In addition, when an amount of the steam generated in the generator set 100 is larger than an amount of the steam used in the additional sets 401a to 401p, an excessive steam is used in the condenser sets 501a to 501q, and the plant control device 600 controls the adjusting valves 503a to 503q disposed on the upstream sides of the condensers 502a to 502q depending on one of the two modes, i.e., the gas-turbine load control mode 7a and the steam-turbine load control mode 7b.

Thus, an amount of the steam to be sent to the condensers 502a to 502q can be adjusted depending on an operational situation of the power generation plant. Therefore, an amount of the steam generated in the power generation plant 100 and an amount of the steam used in the additional sets 401a to 401p and the condenser sets 501a to 501q can be constantly well balanced.

Second Embodiment

Figure 8:
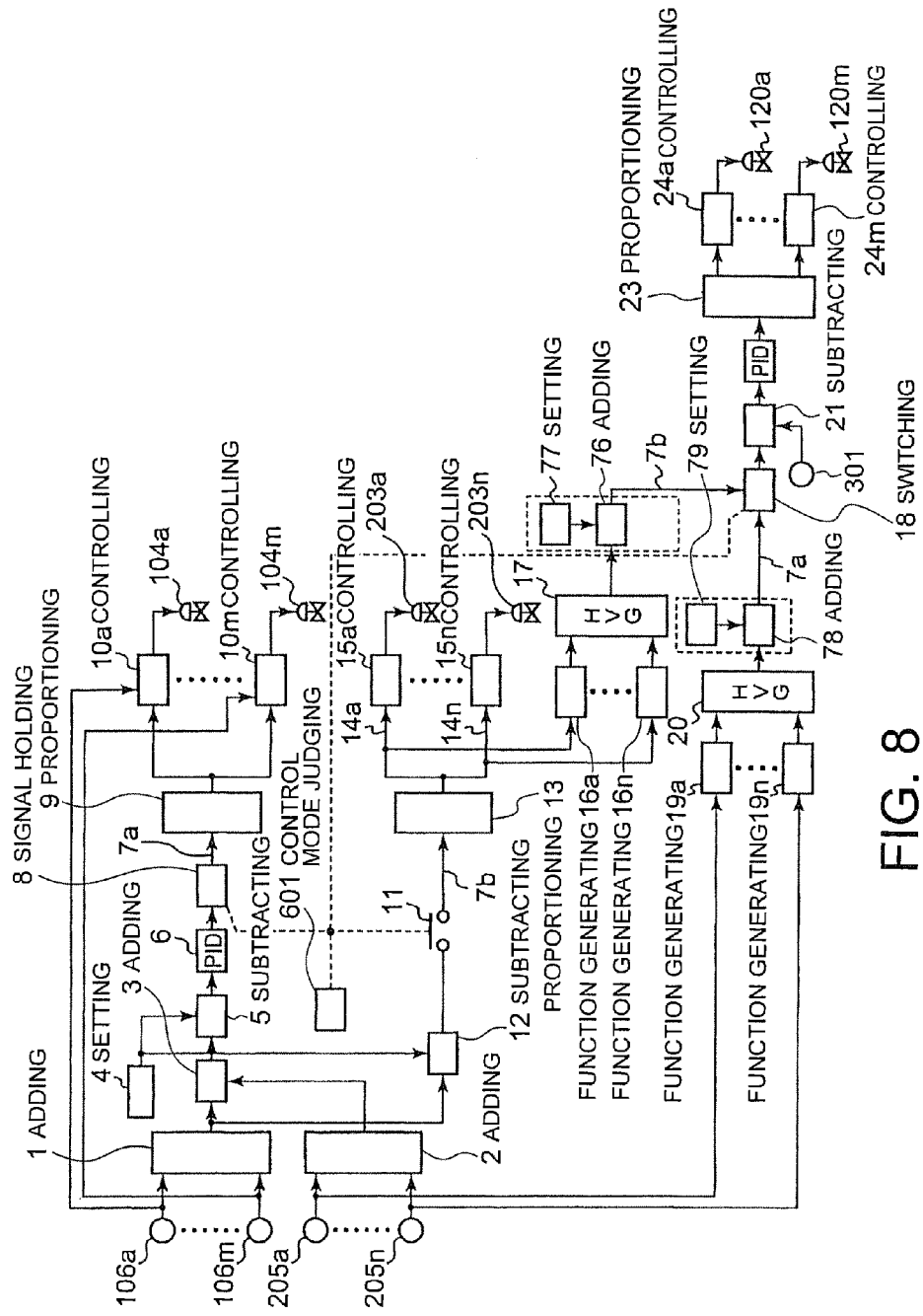
FIG. 8 is a block diagram showing, in a second embodiment, a control of fuel valves of gas turbines and auxiliary fuel valves of duct burners in gas turbine generator sets, and steam regulating valves of steam turbines in steam turbine generator sets.
Figure 9:
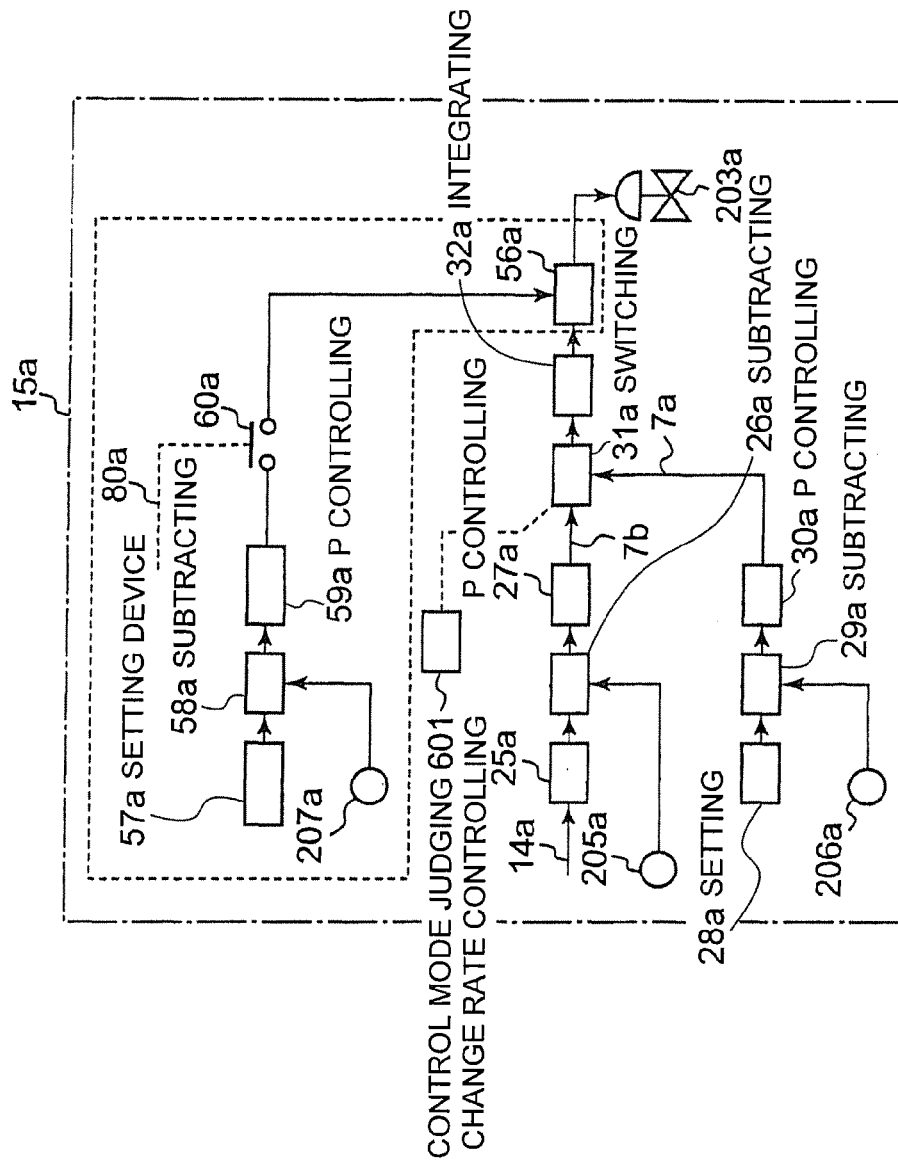
FIG. 9 is a block diagram showing a detailed control system structure by a steam turbine control device in FIG. 8.

A second embodiment of the present invention will be described herebelow with reference to the drawings. FIG. 8 is bloc diagram showing a control of fuel valves 104a to 104m of gas turbines 102a to 102m of gas turbine generator sets 101a to 101m, auxiliary fuel valves 120a to 120m of duct burners 119a to 119m, and steam regulating valves 203a to 203n of steam turbines 202a to 202n of steam turbine generator sets 201a to 201n. FIG. 9 is a block diagram showing a detailed control system structure by a steam turbine control device 15a in FIG. 8.

In the second embodiment shown in FIGS. 8 and 9, the same parts as those of the first embodiment shown in FIGS. 1 to 7 are shown by the same reference numbers, and a detailed description thereof is omitted.

A plant control device 600 in this embodiment differs from that of the first embodiment in that a method of controlling the steam regulating valves 203a to 203n of the steam turbine generator sets 201a to 201n, and a method of controlling the auxiliary fuel valves 120a to 120m of the duct burners 119a to 119m of the gas turbine generator sets 101a to 101m, differ from the control methods in the first embodiment. Other parts of the plant control device 600 in this embodiment are substantially the same as those of the first embodiment shown in FIGS. 1 to 7.

[Control of Regulating Valves on Upstream Sides of Steam Turbines of Steam Turbine Generator Sets]

With reference to FIG. 9, there is described the control of the regulating valves 203a to 203n disposed on upstream sides of the steam turbines 202a to 202n of the steam turbine generator sets 201a to 201n.

The steam turbine control device 15a shown in FIG. 9 differs from the steam turbine control device 15a in the first embodiment in that, as shown by the dotted-line frame, the steam turbine control device 15a in the second embodiment includes an adder 56a disposed on a downstream side of an integrator 32a, and a unit for inputting an adjusting-valve control command value to the adder 56a, which is described hereafter. Other parts of the steam turbine control device 15a in the second embodiment are substantially the same as those of the first embodiment.

Firstly, a rotational speed of the steam turbine 202a, which is detected by a rotational speed detecting unit 207a, is sent to a subtracter 58a. On the other hand, set in a setting device 57a is a rotational speed set value of the steam turbine 202a. The rotational speed set value is sent to the subtracter 58a. In the subtracter 58a, there is calculated a difference between the detected rotational speed, which is sent from the rotational speed detecting unit 207a, and the rotational speed set value, which is sent from the setting device 57a. Then, the difference is sent to a P controller 59a. In the P controller 59a, an adjusting-valve control command value is adjusted by the P control (proportional control) such that the difference sent from the subtracter 58a is made smaller. The adjusted adjusting-valve control command value is sent to a switch 60a.

When a bias set mode 80a is ON, the switch 60a is adapted to send the adjusting-valve control command value, which is adjusted by the P controller 59a, to the adder 56a. On the other hand, when the bias set mode 80a is OFF, the switch 60a is adapted to block the transmission of the adjusting-valve control command value from the P controller 59a to the adder 56a. Herein, turning on and turning off of the bias set mode 80a can be switched depending on an operational situation of a generator set 100 and a setting by an operator. When an amendment of a frequency variation is performed in the steam turbine 202a is performed, the bias set mode 80a is turned on.

The adder 56a adds a regulating-valve control command value, which is sent from the integrator 32a, and the adjusting-valve control command value, which is sent from the switch 60a, to each other, and sends the added value to the regulating valve 203a. Based on the added regulating-valve control command value, a valve opening degree of the regulating valve 203a is adjusted.

Due to the above control, when the bias set mode 80a is ON, the valve opening degree of the regulating valve 203a is adjusted based on a value obtained by adding the bias value, which is calculated based on the rotational speed of the steam turbine 202a, to the adjusting-valve control command value, which is sent from the integrator 32a in the first embodiment. On the other hand, when the bias set mode 80a is OFF, the valve opening degree of the regulating valve 203a is adjusted based on a value that is identical to the adjusting-valve control command value sent from the integrator 32a in the first embodiment.

In the power generation plant in this embodiment, as described above, when the steam regulating valves 203a to 203n disposed on the upstream sides of the steam turbines 202a to 202n are controlled by the plant control device 600, the bias values calculated based on the rotational speeds of the steam turbines 202a to 202n, which are detected by the rotational speed detecting units 207a to 207n, are further taken into consideration.

Thus, when the steam regulating valves 203a to 203n disposed on the upstream sides of the steam turbines 202a to 202n are controlled, the rotational speeds of the steam turbines 202a to 202n are also taken into consideration. Therefore, flow rates of the steams to be sent to the steam turbines 202a to 202n of the steam turbine generator sets 201a to 201n can be more accurately controlled depending on operational situations of the steam turbines 202a to 202n.

[Control of Auxiliary Fuel Valves on Upstream Sides of Duct Burners of Gas Turbine Generator Sets]

With reference to FIG. 8, there is described the control of the auxiliary fuel valves 120a to 120m disposed on the upstream sides of the duct burners 119a to 119m of the gas turbine generator sets 101a to 101m.

The plant control device 600 shown in FIG. 8 differs from the plant control device in the first embodiment in that, as shown by the dotted-line frames, the plant control device 600 shown in FIG. 8 includes adders 76 and 78 and setting devices 77 and 79 disposed on the downstream sides of a high value selector 17 and a high value selector 20. Other parts of the plant control device 600 are substantially the same as those of the first embodiment.

In the control of the auxiliary fuel valves 120a to 120m disposed on the upstream sides of the duct burners 119a to 119m, a duct burner set value, which is selected by the high value selector 17, is firstly sent to the adder 76. On the other hand, a bias value is set in the setting device 77, and the bias value is sent to the adder 76. The adder 76 adds the duct burner set value, which is sent from the high value selector 17, and the bias value, which is sent from the setting device 77, to each other, and sends the added value to a switching device 18.

In FIG. 8, a duct burner set value, which is selected by the high value selector 20, is sent to the adder 78. A bias value is set in the setting device 79, and the bias value is sent to the adder 78. The adder 78 adds the duct burner set value, which is sent from the high value selector 20, and the bias value, which is sent from the setting device 79, to each other, and sends the added value to the switching device 18.

The bias values set by the setting devices 77 and 79 are determined based on the rotational speeds of the steam turbines 202a to 202n.

Due to the above control, valve opening degrees of the auxiliary fuel valves 120a to 120m can be adjusted based on the value obtained by adding the bias value to the duct burner set value in the first embodiment.

Thus, in the power generation plant in this embodiment, in the control of the auxiliary fuel control valves 120a to 120m, the bias values determined based on the rotational speeds of the steam turbines 202a to 202n are taken into consideration. Therefore, an amount of the auxiliary fuel to be sent to the duct burners 119a to 119m can be adjusted into a desired amount, referring to amendments of frequency variations in the steam turbines 202a to 202n. Therefore, an amount of the fuel combustion gas used in heat recovery steam generators 111a to 111m can be accurately adjusted.

Third Embodiment

Figure 10:
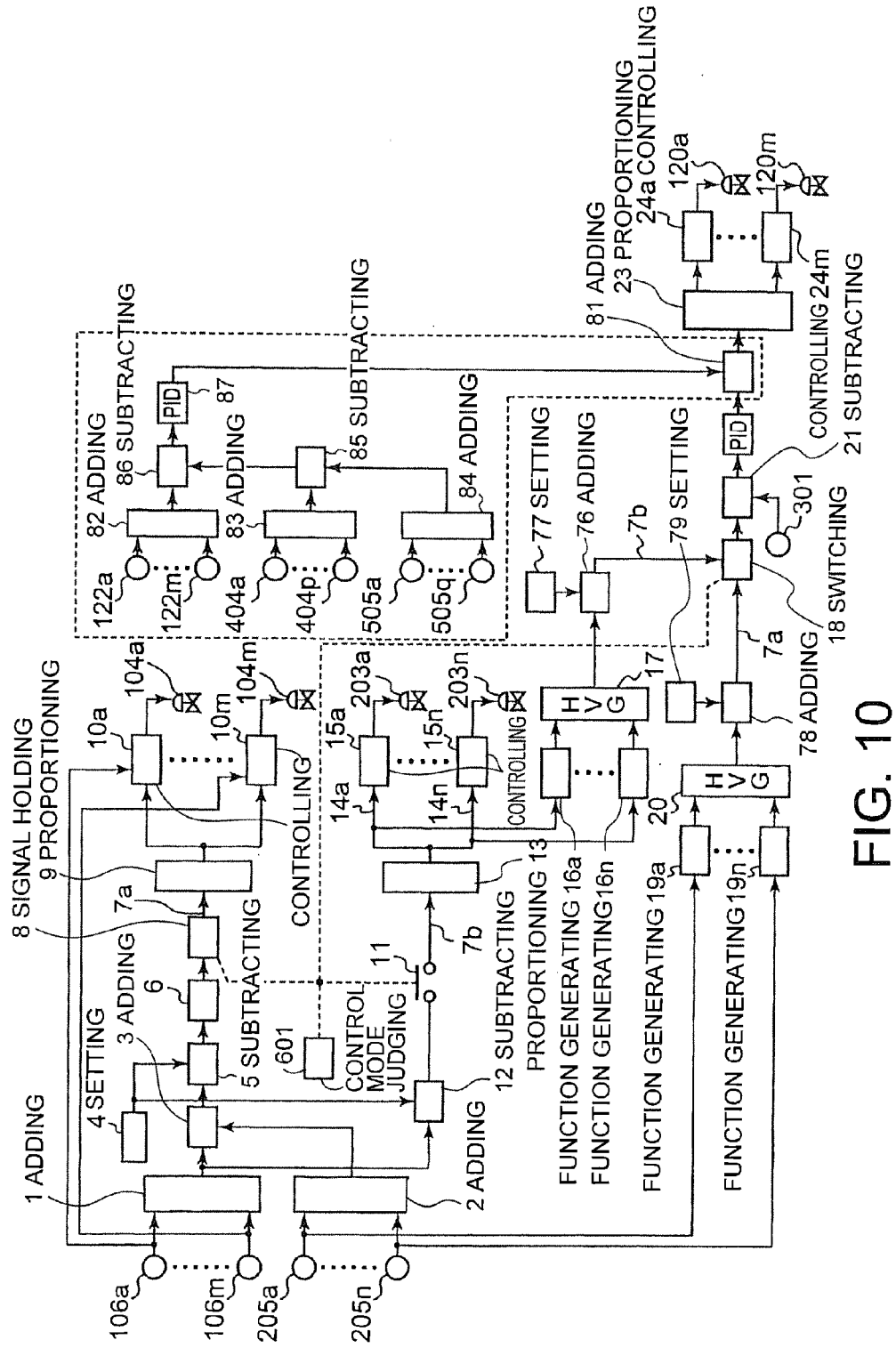
FIG. 10 is a block diagram showing, in a third embodiment, a control of fuel valves of gas turbines and auxiliary fuel valves of duct burners in gas turbine generator sets, and steam regulating valves of steam turbines in steam turbine generator sets.

A third embodiment of the present invention will be described herebelow with reference to the drawings. FIG. 10 is a block diagram showing a control of fuel valves 104a to 104m of gas turbines 102a to 102m of gas turbine generator sets 101a to 101m, auxiliary fuel valves 120a to 120m of duct burners 119a to 119m, and steam regulating valves 203a to 203n of steam turbines 202a to 202n of steam turbine generator sets 201a to 201n.

In the third embodiment shown in FIG. 10, the same parts as those of the second embodiment shown in FIG. 8 are shown by the same reference numbers, and a detailed description thereof is omitted.

A plant control device 600 in this embodiment differs from those of the first and the second embodiments in that a method of controlling the auxiliary fuel valves 120a to 120m disposed on upstream sides of the duct burners 119a to 119m of the gas turbine generator sets 101a to 101m differs from those of the first and the second embodiments. Other parts of the plant control device 600 in this embodiment are substantially the same as those of the second embodiment shown in FIG. 8.

[Control of Auxiliary Fuel Valves on Upstream Sides of Duct Burners of Gas Turbine Generator Sets]

With reference to FIG. 10, there is described the control of the auxiliary fuel valves 120a to 120m disposed on the upstream sides of the duct burners 119a to 119m of the gas turbine generator sets 101a to 101m.

The plant control device 600 shown in FIG. 10 differs from the plant control device in the second embodiment in that, as shown by the dotted-line frame, the plant control device shown in FIG. 10 includes an adder 81 disposed on a downstream side of a PID controller 22, and a unit for inputting a fuel-valve control command value to the adder 81, which is described hereafter. Other parts of the plant control device shown in FIG. 10 are substantially the same as those of the second embodiment.

In FIG. 10, flow rates of steams on the downstream sides of heat recovery steam generators 111a to 111m, which are detected by respective flow rate detecting units 122a to 122m, are respectively sent to an adder 82. The adder 82 adds these flow rates sent thereto. In addition, flow rates of steams on the upstream sides of heat exchangers 402a to 402p, which are detected by respective flow rate detecting units 404a to 404p, are respectively sent to an adder 83. The adder 83 adds these flow rates sent thereto. Further, flow rates of steams on the upstream sides of condensers 502a to 502q, which are detected by respective flow rate detecting units 505a to 505q, are respectively sent to an adder 84. The adder 84 adds these flow rates sent thereto.

A sum value of the steam flow rates on the upstream sides of the heat exchanger 402a to 402p, which are added by the adder 83, and a sum value of the steam flow rates on the upstream sides of the condensers 502a to 502q, which are added by the adder 84, are respectively sent to an adder 85. The adder 85 adds the sum value of the steam flow rates, which is sent from the adder 83, and the sum value of the steam flow rates, which is sent from the adder 84, to each other, and sends the added value to a subtracter 86. On the other hand, the sum value of the steam flow rates on the downstream sides of the heat recovery steam generators 111a to 111m, which are added by the adder 82, is sent to the subtracter 86. In the subtracter 86, there is calculated a difference between the value sent from the adder 82 and the value sent from the adder 85. Then, the difference is sent to a PID controller 87.

In the PID controller 87, a fuel-valve control command value is adjusted by the PID control such that the difference sent from the subtracter 86 is made smaller. The adjusted fuel-valve control command value is sent to the adder 81. The PID controller 87 may adjust the fuel-valve control command value, not by the PID control, but by the P (proportional) control. The adder 81 adds a fuel-valve control command value, which is sent from a PID controller 22, and the fuel-valve control command value, which is sent from the PID controller 87, to each other, and sends the added value to a proportioner 23.

Due to the above control, valve opening degrees of the auxiliary fuel valves 120a to 120m can be adjusted based on a value obtained by adding a bias value, which is calculated based on the difference between the steam amount on the upstream sides of the steam turbine generator sets 201a to 201n and the steam amount on the downstream sides thereof, to the fuel-valve control command value in the second embodiment.

According to the power generation plant in this embodiment, when the auxiliary fuel valves 120a to 120m disposed on the upstream sides of the duct burners 119a to 119m are controlled, the difference between an amount of the steam generated in a generator set 100, and a sum value of the amounts of the steams used in the additional sets 401a to 401p and the amounts of the steams used in the condenser sets 501a to 501q, are taken into consideration. Thus, an amount of the fuel to be sent to duct burners 119a to 119m can be adjusted into a desired amount depending on an operational situation of the power generation plant, so that an amount of the fuel gas to be used in the heat recovery steam generators 111a to 111m can be adjusted. Therefore, flow rates of the steams discharged from the heat recovery steam generators 111a to 111m of the gas turbine generator sets 101a to 101m can be more accurately controlled depending on an operational situation of the power generation plant.

As another control method of the plant control device 600 in the third embodiment, the following method can be employed instead of the aforementioned method. That is, in FIG. 10, a sum load command value of the steam turbines 202a to 202n, which is an output of a switch 11, and a sum load value of the steam turbines 202a to 202n, which is an output of an adder 2, are respectively sent to the subtracter 86. In the subtracter 86, there is calculated a difference between the value sent from the switch 11 and the value sent from the adder 2. Then, the difference is sent to the PID controller 87.

As a still another control method, the following method can be employed. That is, in FIG. 3, a sum value of the steam pressure control set values on the exhaust sides of the steam turbines 202a to 202n, which are outputs of the setting devices 28a to 28n, and a sum value of the steam turbine exhaust pressures, which are outputs of the steam-turbine exhaust-pressure detecting units 206a to 206n, are respectively sent to the subtracter 86. In the subtracter 86, there is calculated a difference between a sum of the values sent from the setting devices 28a to 28n and a sum of the values sent from the steam-turbine exhaust-pressure detecting units 206a to 206n. Then, the difference is sent to the PID controller 87.

As a still further another control method, the following method can be employed. That is, a sum of preset load command values of the additional sets 401a to 401p, and a sum of actually detected load values of the additional sets 401a to 401p, are respectively sent to the subtracter 86. In the subtracter 86, there is calculated a difference between the values. Then, the difference is sent to the PID controller 87.

Fourth Embodiment

Figure 11:
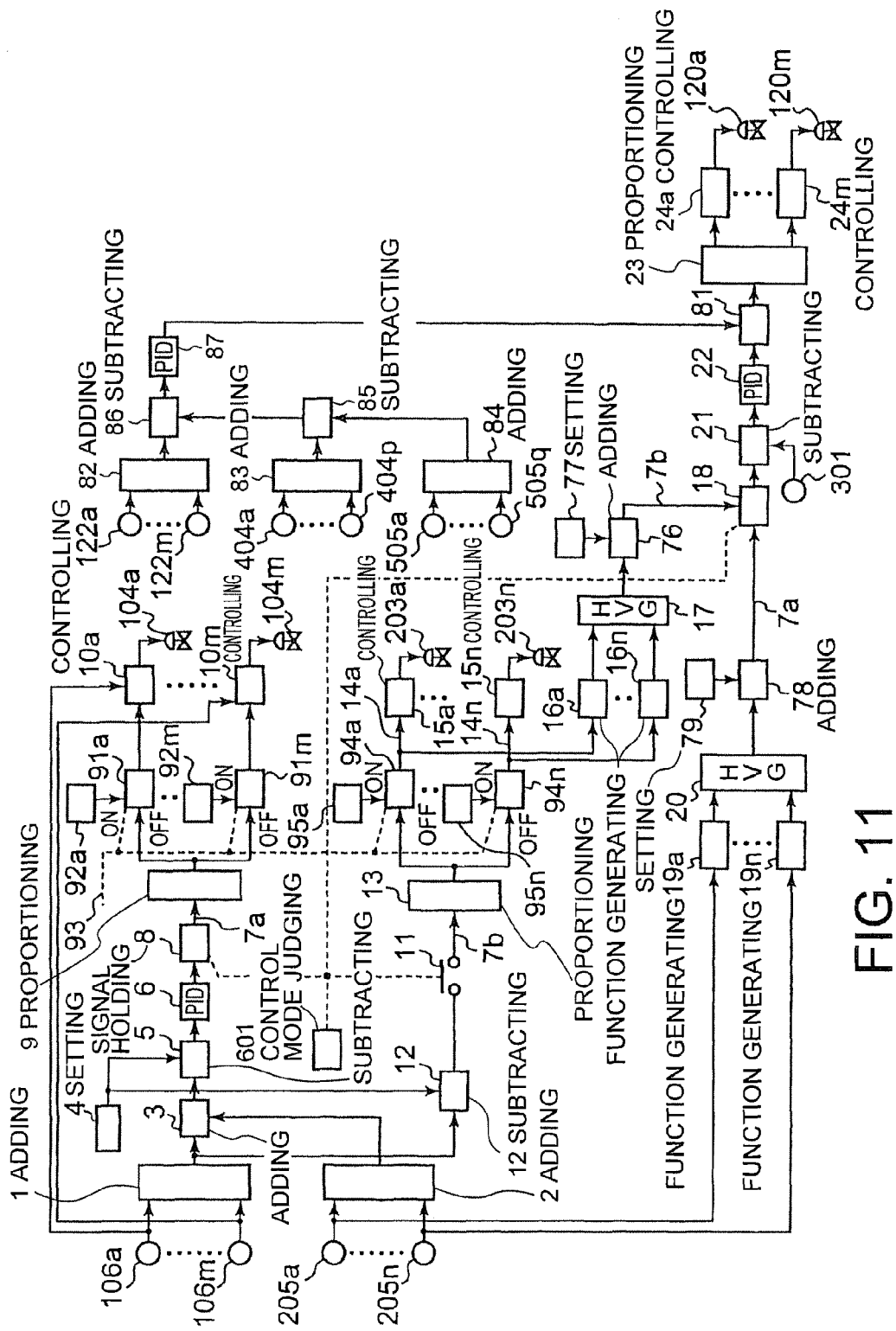
FIG. 11 is a block diagram showing, in a fourth embodiment, a control of a fuel valve of a gas turbine and an auxiliary fuel valve of a duct burner in a gas turbine generator set, and a steam regulating valve of a steam turbine in a steam turbine generator set.
Figure 12:
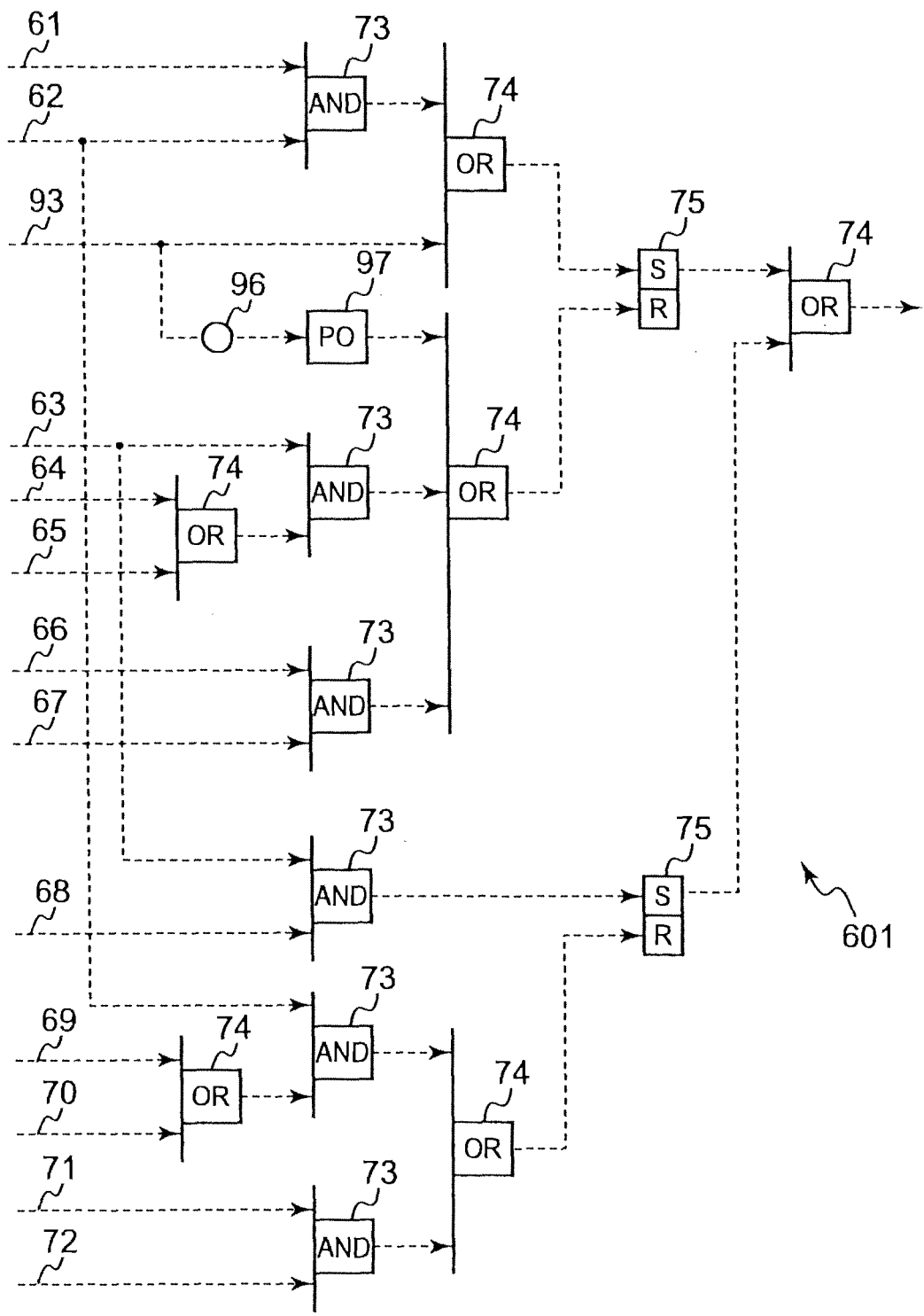
FIG. 12 is a view for explaining a judging method of a control mode judgment logic device employed in the fourth embodiment.

A fourth embodiment of the present invention will be described herebelow with reference to the drawings. FIG. 11 is a block diagram showing a control of fuel valves 104a to 104m of gas turbines 102a to 102m of gas turbine generator sets 101a to 101m, auxiliary fuel valves 120a to 120m of duct burners 119a to 119m, and steam regulating valves 203a to 203n of steam turbines 202a to 202n of steam turbine generator sets 201a to 201n. FIG. 12 is a view for explaining a judging method of a control mode judgment logic device 601 employed in this embodiment.

In the fourth embodiment shown in FIGS. 11 and 12, the same parts as those of the first embodiment shown in FIG. 7 and the second embodiment shown in FIG. 8 are shown by the same reference numbers, and a detailed description thereof is omitted.

A plant control device 600 in this embodiment differs from the control devices in the first to the third embodiments in that the plant control device 600 in this embodiment includes a generator independent load control mode 93, and that a judging method is performed by the control mode judgment logic device 601 based on the generator independent load control mode 93. Other parts of the plant control device 600 in this embodiment are substantially the same as those of the first embodiment shown in FIG. 7 and the third embodiment shown in FIG. 10.

The control method of the plant control device 600 in this embodiment shown in FIG. 12 differs from the control method in the third embodiment in that switching devices 91a to 91m and switching devices 94a to 94n for switching on and off the generator independent load control mode 93 are disposed on downstream sides of a proportioner 9 and a proportioner 13, respectively. Hereafter, the control method of the plant control device 600 in this embodiment is described.

The generator independent load control mode 93 is adapted to be switched on and off by a signal sent from a central feed command part or a setting by an operator.

Firstly, set in setting devices 92a to 92m are independent load set values corresponding to structures of the gas turbine generator sets 105a to 105m. The independent load set values are sent to the switching devices 91a to 91m. The independent load set values are values sent from the central feed command part or values inputted by an operator. When the generator independent load control mode 93 is ON, the switching devices 91a to 91m send the independent load set values, which are respectively sent from the setting devices 92a to 92m, to respective gas turbine control devices 10a to 10m. On the other hand, when the generator independent load control mode 93 is OFF, the switching devices 91a to 91m send fuel-valve load control command values, which are sent from the proportioner 9, to the respective gas turbine control devices 10a to 10m.

Set in setting devices 95a to 95n are independent load set values corresponding to structures of steam turbine generators 204a to 204n. The independent load set values are sent to the setting devices 94a to 94n. The independent load set values are values sent from the central feed command part or values inputted by an operator. When the generator independent load control mode 93 is ON, the switching devices 94a to 94m send the independent load set values, which are respectively sent from the setting devices 95a to 95m, to respective steam turbine load control devices 15a to 15n. On the other hand, when the generator independent load control mode 93 is OFF, the switching devices 94a to 94n send load command values, which are sent from the proportioner 13, to the respective steam turbine load control devices 15a to 15m.

Next, with reference to FIG. 12, there is described the judging method by the control mode judgment logic device 601 in this embodiment.

The judging method by the control mode judgment logic device 601 shown in FIG. 12 differs from the judging method by the control mode judgment logic device 601 in the first embodiment shown in FIG. 7 only in that a signal of the generator independent load control mode 93 is added as an input signal. Others are the substantially the same as those of the judging method by the control mode judgment logic device in the first embodiment shown in FIG. 7.

The judging method by the control mode judgment logic device 601 in FIG. 12 is concretely described. On the downstream side of an AND logic 73 to which a signal 61, which indicates that all the activated gas turbines reach a minimum load, and a signal 62, which indicates that a whole generator set load is lowering, are sent, there is disposed an OR logic 74 to which a signal from the AND logic 73 and a signal of the generator independent load control mode 93 are sent. In addition, there is further disposed a NOT logic 96 to which a signal of the generator independent load control mode 93 is sent. Disposed on the downstream side of the NOT logic 96 is a one-shot timer 97. The NOT logic 96 is adapted to output an OFF signal when a signal of the generator independent load control mode 93 is an ON signal, and to output an ON signal when a signal of the generator independent load control mode 93 is an OFF signal. The one-shot timer 97 is adapted to output, when an ON signal is inputted, an ON signal for a certain time period that is set in the one-shot timer 97.

Due to the above control, when the generator independent load control mode 93 is ON by a signal sent from the central feed command part or a setting by an operator, loads of the gas turbine generator sets 101a to 101m or loads of the steam turbine generator sets 201a to 201n can be independently controlled, based on the independent load set values corresponding to the structures of the respective gas turbine generators 105a to 105m or the structures of the respective steam turbine generators 204a to 204n, the independent load set values being sent from the central feed command part or inputted by an operator.

In addition, due to the control mode judgment logic device 601 capable of performing the judgment shown in FIG. 12, when the generator independent load control mode 93 is ON, the auxiliary fuel valves 120a to 120m on the upstream sides of the duct burners 119a to 119m and the adjusting valves 503a to 503q on the upstream sides of the condensers 502a to 502q can be controlled, with the steam-turbine load control mode 7b which has been described in the first to third embodiments.

According to the power generation plant in this embodiment, by performing the control with the generator independent load control mode 93 being ON, the fuel valves 104a to 104m disposed on the upstream sides of the combustors 103a to 103m and the regulating valves 203a to 203n disposed on the upstream sides of the steam turbines 202a to 202n can be independently controlled respectively, based on the preset independent load set values which are previously set correspondingly to the structures of the gas turbine generators 105a to 105m and the structures of the steam turbine generators 204a to 204n. Thus, flow rates of the steams to be discharged from the heat recovery steam generators 111a to 111m of the gas turbine generator sets 101a to 101m, and flow rates of the steams to be sent to the steam turbines 202a to 202n of the steam turbine generator sets 201a to 201n, can be more accurately adjusted.

The invention claimed is:

1. A power generation plant comprising:
a gas turbine generator set including a combustor configured to burn a fuel sent thereto via a fuel valve, a gas turbine driven by a combustion gas sent from the combustor, a gas turbine generator connected to the gas turbine and configured to generate a power, a heat recovery steam generator configured to generate a steam by an exhaust heat of the combustion gas exhausted from the gas turbine, and a gas-turbine load detecting unit configured to detect a load of the gas turbine generator;
a steam turbine generator set including a steam turbine driven by the steam sent from the heat recovery steam generator via a steam regulating valve, a steam turbine generator connected to the steam turbine and configured to generate a power, a steam-turbine load detecting unit configured to detect a load of the steam turbine generator, and a steam-turbine exhaust pressure detecting unit configured to detect a pressure of the steam sent from the steam turbine;
an additional set configured to use an exhaust steam of the steam turbine or a steam sent from the heat recovery steam generator; and
a plant control device including two switchable control modes which include a gas-turbine load control mode and a steam-turbine load control mode, the plant control device being configured to control the fuel valve of the gas turbine generator set and the steam regulating valve of the steam turbine generator set so as to adjust valve opening degrees of the fuel valve and the steam regulating valve, respectively;
wherein:
the plant control device includes a control mode judgment logic device configured to judge which one of the gas-turbine load control mode and the steam-turbine load control mode is used, depending on an operational situation of the power generation plant;
when the control is performed with the gas-turbine load control mode based on the judgment result from the control mode judgment logic device, the fuel valve is controlled based on a sum of the load of the gas turbine generator, which is detected by the gas-turbine load detecting unit, and the load of the steam turbine generator, which is detected by the steam-turbine load detecting unit, and the steam regulating valve is controlled based on the pressure of the steam, which is detected by the steam-turbine exhaust pressure detecting unit;
when the control is performed with the steam-turbine load control mode based on the judgment result from the control mode judgment logic device, the fuel valve is controlled such that a valve opening degree thereof is maintained constant, and the steam regulating valve is controlled based on a difference between a preset whole generator set load command value and the load of the gas turbine generator, which is detected by the gas-turbine load detecting unit; and
the control mode judgment logic device of the plant control device judges that the control is performed with the steam-turbine load control mode, when the load of the gas turbine generator, which is detected by the gas-turbine load detecting unit, reaches a maximum set value or a minimum set value.

2. The power generation plant according to claim 1, wherein
the steam turbine generator set further includes a rotational speed detecting unit configured to detect a rotational speed of the steam turbine, and
when the steam regulating valve is controlled, the plant control device controls the steam regulating valve, by further taking into consideration a bias value that is calculated by the rotational speed of the steam turbine, which is detected by the rotational speed detecting unit.

3. The power generation plant according to claim 1, wherein:
the heat recovery steam generator of the gas turbine generator set includes a duct burner configured to burn an auxiliary fuel sent thereto via an auxiliary fuel valve, and the heat recovery steam generator is configured to heat a condensed water introduced thereto by a heat exchange, with the use of an auxiliary combustion gas generated by the duct burner in addition to the combustion gas sent from the gas turbine;
disposed between the gas turbine generator set and the steam turbine generator set is a pressure detecting unit on an upstream side of the steam turbine generator set, the pressure detecting unit being configured to detect a pressure of a steam sent from the gas turbine generator set to the steam turbine generator set;

the plant control device further controls the auxiliary fuel valve disposed on the upstream side of the duct burner so as to adjust a valve opening degree of the auxiliary fuel valve; and when the control is performed with the gas-turbine load control mode, the plant control device controls the auxiliary fuel valve disposed on the upstream side of the duct burner based on a difference between a set value, which is obtained by adding a preset bias value to a duct burner set value calculated based on the load of the steam turbine generator, and the pressure of the steam, which is detected by the pressure detecting unit on the upstream side of the steam turbine generator set, and when the control is performed with the steam-turbine load control mode, the plant control device controls the auxiliary fuel valve disposed on the upstream side of the duct burner based on difference between a duct burner set value, which is calculated based on a difference between the whole generator set load command value and the load of the gas turbine generator, and the pressure of the steam, which is detected by the pressure detecting unit on the upstream side of the steam turbine generator set.

4. The gas generation plant according to claim 3, wherein:

the gas turbine generator set further includes a heat-recovery-steam-generator exhaust pressure detecting unit configured to detect a pressure of the steam sent from the heat recovery steam generator;

disposed on a downstream side of the heat recovery steam generator of the gas turbine generator set is a bypass line configured to directly send the steam discharged from the heat recovery steam generator to the additional set, the bypass line being provided with a turbine bypass valve;

disposed between the steam turbine generator set and the additional set is a pressure detecting unit on the downstream side of the steam turbine generator set, the pressure detecting unit being configured to detect a pressure of the steam sent from the steam turbine generator set to the additional set;

the plant control device further includes a heat-recovery-steam-generator activation stop mode that can be switched on and off depending on an operational situation of the heat recovery steam generator, in order to control the turbine bypass valve on the bypass line so as to adjust a valve opening degree of the turbine bypass valve; and when the heat-recovery-steam-generator activation stop mode is ON, the plant control device controls the turbine bypass valve based on the pressure of the steam, which is detected by the heat-recovery-steam-generator exhaust pressure detecting unit, and when the heat-recovery-steam-generator activation stop mode is OFF, the plant control device controls the turbine bypass valve based on the pressure of the steam, which is detected by the pressure detecting unit on the downstream side of the steam turbine generator set.

5. The power generation plant according to claim 4, wherein:

the gas turbine generator set further includes a flow rate detecting unit configured to measure a flow rate of the steam sent from the heat recovery steam generator;

the additional set further includes a heat exchanger configured to condense the steam sent from the steam turbine, and a flow rate detecting unit configured to measure a flow rate of a steam to be sent to the heat exchanger; and when the auxiliary fuel valve disposed on the upstream side of the duct burner is controlled, the plant control device controls the auxiliary fuel valve, by further taking into consideration a difference between the flow rate of the steam, which is detected by the flow rate detecting unit of the gas turbine generator set, and the flow rate of the steam, which is detected by the flow rate detecting unit of the additional set.

6. The power generation plant according to claim 4, further comprising a condenser set including a condenser to which a steam is sent thereto from the steam turbine via an adjusting valve, the steam being other than a steam to be sent to the heat exchanger of the additional set, the condenser being configured to generate a condensed water from the steam by a heat exchange, and a condensing pump configured to send the condensed water discharged from the condenser to the heat recovery steam generator, wherein:

the plant control device further controls the adjusting valve disposed on the upstream side of the condenser so as to adjust a valve opening degree of the adjusting valve;

when the control is performed with the gas-turbine load control mode, the plant control device controls the adjusting valve disposed on the upstream side of the condenser based on a difference between a set value, which is obtained by adding a preset bias value to a condenser pressure set value, and the pressure of the steam, which is detected by the pressure detecting unit on the downstream side of the steam turbine generator set, and when the control is performed with the steam-turbine load control mode, the plant control device controls the adjusting valve disposed on the upstream side of the condenser based on a difference between the condenser pressure set value and the pressure of the steam detected by the pressure detecting unit on the downstream side of the steam turbine generator set.

7. The power generation plant according to claim 6, wherein:

the gas turbine generator set further includes a flow rate detecting unit configured to measure a flow rate of the steam sent from the heat recovery steam generator;

the additional set further includes a flow rate detecting unit configured to measure a flow rate of the steam to be sent to the heat exchanger, and the condenser set further includes a flow rate detecting unit configured to measure a flow rate of the steam to be sent to the condenser; and when the auxiliary fuel valve disposed on the upstream side of the duct burner is controlled, the plant control device controls the auxiliary fuel valve, by further taking into consideration a difference between the flow rate of the steam, which is detected by the flow rate detecting unit of the gas turbine generator set, and a sum of the flow rate of the steam detected by the flow rate detecting unit of the additional set and the flow rate of the steam detected by the flow rate detecting unit of the condenser set.

8. The power generation plant according to claim 1, wherein:

the plant control device further includes a generator independent load control mode that can be switched on and off;

when the generator independent load control mode is ON, the plant control device controls the fuel valve disposed on the upstream side of the combustor based on an independent load set value that is preset correspondingly to a structure of the gas turbine generator, and the plant control device controls the regulating valve disposed on the upstream side of the steam turbine based on an independent load set value that is preset correspondingly to a structure of the steam turbine generator.

9. A control method of a power generation plant comprising: a gas turbine generator set including a combustor configured to burn a fuel sent thereto via a fuel valve, a gas turbine driven by a combustion gas sent from the combustor, a gas turbine generator connected to the gas turbine and configured to generate a power, a heat recovery steam generator configured to generate a steam by an exhaust heat of the combustion gas exhausted from the gas turbine, and a gas-turbine load detecting unit configured to detect a load of the gas turbine generator; a steam turbine generator set including a steam turbine driven by the steam sent from the heat recovery steam generator via a steam regulating valve, a steam turbine generator connected to the steam turbine and configured to generate a power, a steam-turbine load detecting unit configured to detect a load of the steam turbine generator, and a steam-turbine exhaust pressure detecting unit configured to detect a pressure of the steam sent from the steam turbine; an additional set configured to use an exhaust steam of the steam turbine or a steam sent from the heat recovery steam generator; and a plant control device including two switchable control modes which include a gas-turbine load control mode and a steam-turbine load control mode, the plant control device being configured to control the fuel valve of the gas turbine generator set and the steam regulating valve of the steam turbine generator set so as to adjust valve opening degrees of the fuel valve and the steam regulating valve, respectively;

the control method comprising:

a step in which, which one of the gas-turbine load control mode and the steam-turbine load control mode is used is judged by a control mode judgment logic device of the plant control device, depending on an operational situation of the power generation plant; and a step in which, when the control is performed with the gas-turbine load control mode based on the judgment result from the control mode judgment logic device, the fuel valve of the combustor is controlled based on a sum of the load of the gas turbine generator, which is detected by the gas-turbine load detecting unit, and the load of the steam turbine generator, which is detected by the steam-turbine load detecting unit, and the steam valve regulating valve is controlled based on the pressure of the steam, which is detected by the steam-turbine exhaust pressure detecting unit, and when the control is performed with the steam-turbine load control mode based on the judgment result from the control mode judgment logic device, the fuel valve of the combustor is controlled such that a valve opening degree thereof is maintained constant, and the steam regulating valve is controlled based on a difference between a preset whole generator set load command value and the load of the gas turbine generator, which is detected by the gas-turbine load detecting unit;

wherein:

the control mode judgment logic device of the plant control device judges that the control is performed with the steam-turbine load control mode, when the load of the gas turbine generator, which is detected by the gas-turbine load detecting unit, reaches a maximum set value or a minimum set value.

* * * * *